(12) United States Patent
Yuen et al.

(10) Patent No.: US 8,447,700 B2
(45) Date of Patent: *May 21, 2013

(54) TRANSACTION AUTHORIZATION SERVICE

(75) Inventors: Philip Yuen, Bellevue, WA (US);
Chih-Jen Huang, Kirkland, WA (US);
Gerald Yuen, Pasadena, CA (US)

(73) Assignee: Amazon Technologies, Inc., Reno, NV (US)

(*) Notice: Subject to any disclaimer, the term of this patent is extended or adjusted under 35 U.S.C. 154(b) by 835 days.

This patent is subject to a terminal disclaimer.

(21) Appl. No.: 11/546,534

(22) Filed: Oct. 10, 2006

(65) Prior Publication Data

US 2007/0094150 A1    Apr. 26, 2007

Related U.S. Application Data

(60) Provisional application No. 60/725,404, filed on Oct. 11, 2005, provisional application No. 60/737,972, filed on Nov. 18, 2005.

(51) Int. Cl.
*H04L 29/06* (2006.01)

(52) U.S. Cl.
USPC ............................................. 705/75; 713/168

(58) Field of Classification Search
USPC .................................................. 713/168–170
See application file for complete search history.

(56) References Cited

U.S. PATENT DOCUMENTS

| | | | |
|---|---|---|---|
| 5,179,721 A | 1/1993 | Comroe et al. | |
| 5,475,756 A | 12/1995 | Merritt | |
| 5,613,012 A | 3/1997 | Hoffman et al. | |
| 5,802,499 A | 9/1998 | Sampson et al. | |
| 5,937,396 A | 8/1999 | Konya | |
| 5,949,044 A | 9/1999 | Walker et al. | |
| 5,956,700 A | 9/1999 | Landry | |

(Continued)

FOREIGN PATENT DOCUMENTS

| | | |
|---|---|---|
| EP | 0668580 | 8/1995 |
| GB | 2397731 | 7/2004 |

(Continued)

OTHER PUBLICATIONS

U.S. Appl. No. 12/056,608, filed Mar. 27, 2008.

(Continued)

*Primary Examiner* — Eleni Shiferaw
*Assistant Examiner* — Phy Anh Vu
(74) *Attorney, Agent, or Firm* — Robert C. Kowert; Meyertons, Hood, Kivlin, Kowert & Goetzel, P.C.

(57) ABSTRACT

System and method for authorizing transactions, such as payments or money transfers. A source entity may initiate a transaction with a target entity via a first communications channel. In initiating the transaction, the source entity may indicate that the transaction is to be performed through a transaction authorization service. The target entity may send a transaction initiation message to the transaction authorization service. In response to receiving the transaction initiation message, the service may authorize the transaction with the source entity via a second communications channel. To authorize the transaction, the source entity may provide a PIN number or other identifier via the second communications channel. After receiving and validating the response from the source entity, the transaction authorization service may inform the target entity that the transaction is authorized. The target entity may then complete the transaction with the transaction authorization service and the source entity.

72 Claims, 10 Drawing Sheets

U.S. PATENT DOCUMENTS

| | | | |
|---|---|---|---|
| 6,085,194 | A | 7/2000 | Ige et al. |
| 6,394,907 | B1 * | 5/2002 | Rowe ............... 463/42 |
| 6,430,407 | B1 | 8/2002 | Turtiainen |
| 6,601,057 | B1 | 7/2003 | Underwood et al. |
| 6,609,113 | B1 * | 8/2003 | O'Leary et al. ............ 705/39 |
| 6,816,724 | B1 | 11/2004 | Asikainen |
| 7,031,733 | B2 | 4/2006 | Alminana et al. |
| 7,076,329 | B1 | 7/2006 | Kolls |
| 7,089,208 | B1 | 8/2006 | Levchin et al. |
| 7,127,264 | B2 | 10/2006 | Hronek et al. |
| 7,139,694 | B2 | 11/2006 | Horn et al. |
| 7,240,832 | B2 * | 7/2007 | Bendeck et al. ............ 235/383 |
| 7,245,902 | B2 | 7/2007 | Hawkes |
| 7,251,495 | B2 | 7/2007 | Keyani et al. |
| 7,415,442 | B1 | 8/2008 | Battaglini et al. |
| 7,636,695 | B2 | 12/2009 | Driessen |
| 7,693,797 | B2 | 4/2010 | Ekberg |
| 7,716,199 | B2 | 5/2010 | Guha |
| 7,729,989 | B1 | 6/2010 | Yuen |
| 7,904,799 | B1 | 3/2011 | Underwood et al. |
| 2001/0037264 | A1 | 11/2001 | Husemann et al. |
| 2002/0046353 | A1 | 4/2002 | Kishimoto |
| 2002/0156746 | A1 * | 10/2002 | Horn et al. ............ 705/64 |
| 2002/0198849 | A1 | 12/2002 | Piikivi |
| 2003/0033522 | A1 | 2/2003 | Bilgic et al. |
| 2003/0065615 | A1 | 4/2003 | Aschir |
| 2003/0105707 | A1 | 6/2003 | Audebert et al. |
| 2003/0110114 | A1 * | 6/2003 | Dmochowski et al. ......... 705/36 |
| 2003/0123669 | A1 | 7/2003 | Koukoulidis et al. |
| 2003/0126076 | A1 | 7/2003 | Kwok et al. |
| 2003/0139174 | A1 | 7/2003 | Rao |
| 2003/0144952 | A1 * | 7/2003 | Brown et al. ............ 705/40 |
| 2003/0166396 | A1 | 9/2003 | Vermelle et al. |
| 2003/0171993 | A1 | 9/2003 | Chappuis |
| 2003/0212601 | A1 | 11/2003 | Silva et al. |
| 2004/0006538 | A1 | 1/2004 | Steinberg et al. |
| 2004/0019564 | A1 | 1/2004 | Goldthwaite et al. |
| 2004/0029569 | A1 | 2/2004 | Khan et al. |
| 2004/0078340 | A1 | 4/2004 | Evans |
| 2004/0081110 | A1 | 4/2004 | Koskimies |
| 2004/0205026 | A1 | 10/2004 | Shah et al. |
| 2004/0214597 | A1 | 10/2004 | Suryanarayana et al. |
| 2004/0267618 | A1 | 12/2004 | Judicibus et al. |
| 2005/0044410 | A1 | 2/2005 | Yan |
| 2005/0060250 | A1 | 3/2005 | Heller et al. |
| 2005/0102230 | A1 | 5/2005 | Haidar |
| 2005/0113066 | A1 | 5/2005 | Hamberg |
| 2005/0120249 | A1 | 6/2005 | Shuster |
| 2005/0144020 | A1 | 6/2005 | Muzaffar et al. |
| 2005/0192893 | A1 | 9/2005 | Keeling et al. |
| 2005/0220134 | A1 | 10/2005 | Lin |
| 2005/0238149 | A1 | 10/2005 | De Leon |
| 2005/0256781 | A1 | 11/2005 | Sands et al. |
| 2006/0080232 | A1 * | 4/2006 | Epps ............... 705/39 |
| 2006/0131390 | A1 | 6/2006 | Kim |
| 2006/0149644 | A1 | 7/2006 | Sulmar et al. |
| 2006/0206709 | A1 | 9/2006 | Labrou et al. |
| 2006/0253339 | A1 | 11/2006 | Singh et al. |
| 2006/0253392 | A1 | 11/2006 | Davies |
| 2007/0022019 | A1 | 1/2007 | Sherwin et al. |
| 2007/0022469 | A1 | 1/2007 | Cooper et al. |
| 2007/0027775 | A1 | 2/2007 | Hwang |
| 2007/0047719 | A1 | 3/2007 | Dhawan et al. |
| 2007/0049303 | A1 | 3/2007 | Lee |
| 2007/0054678 | A1 | 3/2007 | Doulton |
| 2007/0055630 | A1 | 3/2007 | Gauthier et al. |
| 2007/0067398 | A1 | 3/2007 | Karmarkar |
| 2007/0094135 | A1 | 4/2007 | Moore et al. |
| 2007/0100651 | A1 | 5/2007 | Ramer et al. |
| 2007/0106564 | A1 | 5/2007 | Matotek et al. |
| 2007/0118514 | A1 | 5/2007 | Mariappan |
| 2007/0175978 | A1 | 8/2007 | Stambaugh |
| 2007/0203836 | A1 | 8/2007 | Dodin |
| 2007/0213991 | A1 | 9/2007 | Bramante |
| 2007/0233615 | A1 | 10/2007 | Tumminaro |
| 2007/0255620 | A1 | 11/2007 | Tumminaro et al. |
| 2007/0255652 | A1 | 11/2007 | Tumminaro et al. |
| 2007/0255653 | A1 | 11/2007 | Tumminaro et al. |
| 2007/0255662 | A1 | 11/2007 | Tumminaro |
| 2007/0257108 | A1 | 11/2007 | Bellino et al. |
| 2007/0282756 | A1 | 12/2007 | Dravenstott et al. |
| 2008/0003977 | A1 | 1/2008 | Chakiris et al. |
| 2008/0006685 | A1 | 1/2008 | Rackley, III et al. |
| 2008/0010190 | A1 | 1/2008 | Rackley, III et al. |
| 2008/0010191 | A1 | 1/2008 | Rackley, III et al. |
| 2008/0010192 | A1 | 1/2008 | Rackley, III et al. |
| 2008/0010193 | A1 | 1/2008 | Rackley, III et al. |
| 2008/0010196 | A1 | 1/2008 | Rackley, III et al. |
| 2008/0010204 | A1 | 1/2008 | Rackley, III et al. |
| 2008/0010215 | A1 | 1/2008 | Rackley, III et al. |
| 2008/0017702 | A1 | 1/2008 | Little et al. |
| 2008/0027844 | A1 | 1/2008 | Little et al. |
| 2008/0040233 | A1 | 2/2008 | Wildman et al. |
| 2008/0040265 | A1 | 2/2008 | Rackley, III et al. |
| 2008/0052620 | A1 | 2/2008 | Hwang |
| 2008/0071633 | A1 | 3/2008 | Ozkan et al. |
| 2008/0109472 | A1 | 5/2008 | Underwood et al. |
| 2008/0147741 | A1 | 6/2008 | Gonen et al. |
| 2008/0177661 | A1 | 7/2008 | Mehra |
| 2008/0181198 | A1 | 7/2008 | Yasrebi et al. |
| 2008/0270251 | A1 | 10/2008 | Coelho et al. |
| 2008/0291899 | A1 | 11/2008 | Gromoll et al. |
| 2009/0106138 | A1 | 4/2009 | Smith et al. |
| 2009/0287601 | A1 | 11/2009 | Tumminaro et al. |
| 2010/0016002 | A1 | 1/2010 | Konicek et al. |
| 2010/0041366 | A1 | 2/2010 | Zackrisson |
| 2010/0130164 | A1 | 5/2010 | Chowdhury et al. |

FOREIGN PATENT DOCUMENTS

| | | |
|---|---|---|
| JP | 2002-207934 | 7/2002 |
| KR | 2002-0045082 | 6/2002 |
| KR | 2005-0007986 | 1/2005 |
| KR | 2005-0120890 | 12/2005 |
| KR | 2005-0122935 | 12/2005 |
| KR | 2006-0106328 | 10/2006 |
| KR | 2006-0114776 | 11/2006 |
| WO | 01/17310 | 3/2001 |
| WO | 2003-005270 | 7/2002 |

OTHER PUBLICATIONS

U.S. Appl. No. 12/056,620, filed Mar. 27, 2008.
U.S. Appl. No. 12/057,148, filed Mar. 27, 2008.
U.S. Appl. No. 11/546,030, filed Oct. 10, 2006.
U.S. Appl. No. 11/611,716, filed Dec. 15, 2006.
U.S. Appl. No. 11/858,006, filed Sep. 19, 2007.
U.S. Appl. No. 11/858,001, filed Sep. 19, 2007.
U.S. Appl. No. 11/858,002, filed Sep. 19, 2007.
"You've Got Money: Paying via Text Message," [online]. The Wall Street Journal Online, Apr. 26, 2006, retrieved from the Internet: / URL's: http://online.wsj.com/article_print/SB114600991211335 921.html [retrieved on Feb. 8, 2007].
"Mobile Payment—Product and Service Description", downloaded from http://www.mobileweb.be/en/sms-payment.asp on Oct. 24, 1007, 3pages.
"Anam introduces SMS payments", downloaded from http://www.theregister.co.uk/2007/06/hash_cash_smspayments/print.html on Oct. 24, 2007, 2 pages.
"Make mobile content delivery and billing cost effective, simple and fast with mSERV!", downloaded from http://mbill.biz/solutions/mserv/?gclid=CMHBhMasql8DFRUHWAod62K8Sg on Oct. 24, 2007, 2 pages.
"All about texting, SMS and MMS", downloaded from http://www.textually.org/textuallv/archives/cat_sms_and_micro_payments.htm on Oct. 24, 2007, 10 pages.
"PayPal to rival TextPayMe for SMS payments?", downloaded from http://www.engadget.com/2006/02/03/paypal-to-rival-textpayme-for-sms-payments on Oct. 24, 2007, 11 pages.
PayPal to launch SMS payments service, downloaded from http://www.finextra.com/fullstory.asp?id=15091 on Oct. 24, 2007, 2 pages.
"US Catches on with SMS Payments", downloaded from http://yugatech.com/b1og/the-internet/us-catches-on-with-sms-payments on Dec. 24, 2007, 8 pages.

"SMS Payment", downloaded from http://www.moldcell.md/eng.Services/Payments./SMSpayment on Oct. 24, 2007, 2 pages.
"Welcome to Sepomo Micropayments", downloaded from http://www.sepomo.com/en/welcom.php on Oct. 24, 2007, 4 pages.
"Secure SMS Payment Solutions", downloaded from http:/www,eko.com.au/?Solutions/Payment on Oct. 24, 2007, 2 pages.
"Why is SMS Marketing more effective than traditional methods?", downloaded from http://www.market-to-cell.com/?ppc_id=l05432& type=GoopleAdwordsSearch&ppc_kw on Oct. 24, 2007, 4 pages.
"SMS/mobile micro payments—how to?", downloaded from http://quomon.com/questions_SMS_mobile_micro_payments-to_193.aspx on Oct. 24, 2007, 3 pages.
"Mobile Payment: A Journey Through Existing Procedures and Standardization Initiatives", by Karnouskos et al., for IEEE Communications Surveys, The Electronic magazine of Original Peer-Reviewed Survey Articles, Fourth Quarter 2004, vol. 6, No. 4, pp. 44-66.
"What is TextPayMe?" [online], TextPayMe, 2005-2006, [retrieved on Nov. 6, 2006]. Retrieved from the Internet: <URL: www.textpayme.com/us/secure/index.tpm>, 1 page.
"PayPal Goes Mobile" [online]. PayPal, 1999-2006, [retrieved on Nov. 6, 2006]. Retrieved from the Internet: <URL's: www.paypal.com/cgi-bin/webscr?cmd=xpt/cps/mobile/MobileOverview-outside; www.paypal.com/cgi-bin/webscr?cmd=xpt/mobileobeSend-outside; www.paypal.com/cgi-bin/webscr?cmd=xpt/cps/mobile/MobileT2B-outside ;www.paypal.com/cgi-bin/webscr?cmd=xpt/cps/mobile/Text2Give-outside; www.paypal.com/cgi-bin/webscr?cmd=xpt/cps/mobile/MobileFAQ-outside; www.shareholder.com/paypal/releaseDetail.cfm?ReleaseID=192226&Category=US>, 14 pages.
"SMS Payment" [online]. Moldcell, 2006, [retrieved on Nov. 6, 2006], Retrieved from the Internet: <URL: www.moldcell.md/eng/Services/Payments/SMSpayment>, 2 pages.
"Atlas Telecom Mobile launches an international text message based payment solution for Internet content" [online]. SMS Kambi, 2003, [retrieved on Nov. 6, 2006]. Retrieved from the Internet: URL:www.srnskambi.com/en/press/2003-03-13.jsp, 1 page.
Atlas Telecom Mobile will offer its payment solution via mobile phone to Tadaa Wireless WiFi clientele [online]. SMS Kambi, 2003, [retrieved on Nov. 6, 2006]. Retrieved from the Internet: <URL: www.smskambi.com/en/press/2003-07-17.jsp>, 1 page.

"Frequently Asked Questions: Answers to all questions about SMS Kambi" [online]. SMS Kambi, 2003, [retrieved on Nov. 6, 2006]. Retrieved from the Internet: <URL: www.smskambi.com/en/faq.jsp>, 5 pages.
"TextPayMe Tour" [online]. TextPayMe, 2005-2006, [retrieved on Nov. 6, 2006]. Retrieved from the Internet: <URL's: www.textpayme.com/us/tour1.tpm; www.textpayme.com/us/tour/tour2.tpm; www.textpayme.com/us/tour/tour3.tpm; www.textpayme.com/us/tour/tour4.tpm; www.textpayme.com/us/secure/register.tpm>, 6 pages.
"Paypal to offer SMS payment" [online]. lol,2006, [retrieved on Nov. 6, 2006]. Retrieved from the Internet: <URL: www.iol.co.za/index.php?set_id=l&click_id=115&art_id=iol1143117211111P140>, 2 pages.
"MobileLime makes shopping more rewarding" [online]. MobileLine, 2006, [retrieved on Nov. 6, 2006]. Retrieved from the Internet: <URL: www.mobilelime.com/mobilelime/home.do?action=index; www.mobilelime.com/mobilelime/home.do?action=consumersl; www.mobilelime,com/mobilelime/home.do?action=earnrewards; www.mobilelime.com/mobilelime/home.do?action=makepurchases; www.mobilelime.com/mobilelime/home.do?action=doitall; www.mobilelime.com/mobilelime/home.do?action=whouses; www.mobilelime.com/mobilelimehome.do?.
"obopay" [online]. Obopay, 2006, [retrieved on Nov. 6, 2006]. Retrieved from the Internet: <URL: https://www.obopay.com/consumer/; www.obopay.eom/consumer/GetHelp.do;jsessionid=F1ndf7KYsThCHJ2HZ2HzlCk472Y1cL6mXbzGyZFyGJvLt2RDjbLz!-468797365?target=LeamMorePage; www.obopay.com/consumer/GetHelp.do?target=HelpTextMessagingPage; www.obopay.com/consumer/GetHelp.do?target=HelpHowWorks>, 8pages.
"BillMonk" [online]. BillMonk, 2006, [retrieved on Nov. 6, 2006]. Retrieved from the Internet: <URL: www.billmonk.com/; www.billmonk.com/about/faq; www.billmonk.com/about/sms; https://www.billmonk.com/images/screenshot_sms_shared_flow.png>, 15 pages.
Layton, J., "How eBay Works," How Stuff Works website. Dec. 3, 2005, all pages. Retrieved via Wayback Machine on Aug. 24, 2010, <http://web.archive.org/web/20051203181517/computer.howstuffworks.com/ebay.htm/printable>.

* cited by examiner

Registration 300

Personal Information

- Name:
- Email:
- Address:
- City:
- State/Territory:
- ZIP code:

Login Information

- Mobile phone number:
- Mobile carrier:
- Create a password:
- Confirm password:

Security Information

- Create a personal ID code:

( Confirm )

Personal page 302

Initiate a transaction

- Target entity:
- Amount:

( Confirm )

Account Information        Change Account Information

View Transaction History        Change password

View Transaction Status

*Figure 15*

this application claims benefit of priority to U.S. Provisional Patent Application No. 60/725,404 filed Oct. 11, 2005 titled "Cellular Telephone Based Payment System Using SMS Messaging" which is hereby incorporated by reference herein in its entirety.

TRANSACTION AUTHORIZATION SERVICE

PRIORITY INFORMATION

This application claims benefit of priority to U.S. Provisional Patent Application No. 60/725,404 filed Oct. 11, 2005 titled "Cellular Telephone Based Payment System Using SMS Messaging" which is hereby incorporated by reference herein in its entirety.

This application claims benefit of priority to U.S. Provisional Patent Application No. 60/737,972 filed Nov. 18, 2005 titled "Payment System with Telephone Authentication" which is hereby incorporated by reference herein in its entirety.

BACKGROUND OF THE INVENTION

1. Field of the Invention

This invention relates to transactions such as electronic funds transfers, and, more particularly, to mechanisms for authorizing transactions.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Web Services

Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Mobile Telephony

Mobile telephony has emerged alongside the Internet and the web, and the two technologies have crossed over and merged to form what is essentially a global communications and information network. Cellular telephones, for example, have become "digital", and continue to become more sophisticated. Today, many digital cell phones are capable of web access via their cellular service providers. Similarly, many web applications are capable of telephone communications to conventional phones and to mobile telephones. In addition, other technologies such as text messaging have emerged to enhance the capabilities and uses of mobile telephones and other personal electronic devices. Further, other personal electronic devices, such as Personal Digital Assistants (PDAs) may provide mobile telephone links to the web, and user interfaces for accessing the web, along with text messaging and other information and communications capabilities. Thus, these devices are part of the emerging global communications and information network.

SMS

SMS (Short Message Service) is a service for sending messages of up to 160 characters (224 characters if using a 5-bit mode) to mobile phones. SMS does not require the mobile phone to be active and within range. An SMS message may be held until the target phone is active and within range. SMS messages may be transmitted within the same cell, or out of the cell to phones with roaming service capability. SMS messages may also be sent to digital phones from a web site, or from one digital phone to another. An SMS gateway is a web site that accepts SMS messages for transmission to cell phones within the cell served by that gateway, or that acts as an international gateway for users with roaming capability.

Various applications of the Internet, and of the web, involve electronic transactions, such as funds transfers. These applications involve the transfer of funds from one entity to one or more other entities. These applications range from transferal of funds between financial institutions to electronic payment by individuals for purchases of goods or services from e-commerce sites. With the merging of mobile telephony and other technologies and the web into an emerging global communications and information network, these other technologies have become part of the transaction process for many such applications. Security when initiating and performing such transactions on the emerging global communications and information network is an ongoing concern. One area of concern is in authorizing transactions involving the electronic transferal of funds from one entity's account to one or more other entities.

SUMMARY

Various embodiments of a system and method for the authorization of transactions, such as payments or money transfers, are described. In embodiments, a transaction authorization service may be provided through which a transaction initiated between a source entity and a target entity via a first communications channel may be authorized with the source entity through a second, separate communications channel. In one embodiment, the source entity may initiate a transaction with the target entity via a first communications channel. In initiating the transaction, the source entity may indicate that the transaction is to be performed through the transaction authorization service. The target entity may then send a transaction initiation message to the transaction authorization service. The transaction initiation message may include, but is not limited to, information identifying the source entity, information identifying the target entity (e.g., a telephone number, account number, email address, alias, etc.), and an amount to be paid or transferred to the target entity. The target entity may, for example, be a commercial enterprise, such as an e-commerce web site, and the transaction may be a purchase of goods or services from the enterprise. Note that the enterprise may accept the transaction authorization service as a valid payment method. As another example, the target entity may be a secured web site or other secured application that requires the source entity to log into an account, and the transaction may be a login attempt.

In response to receiving a valid transaction initiation message, the transaction authorization service may attempt to authorize the transaction with the source entity via a second communications channel. Various embodiments may use different communications channels, for example conventional telephone systems, mobile/cellular phone systems, and text messaging systems (e.g., SMS), as the second communications channel. The transaction authorization service may initiate a communications with a device associated with the second communications channel (e.g., a conventional telephone, a cell phone, a PDA, etc.) that is in the possession of the source entity. The communications may include information identifying the message as authentic (for example, a security phrase), may identify the transaction, and may request authorization of the transaction. To authorize the transaction, the source entity may provide a PIN number or other identifier via the second communications channel in response to the communications.

After receiving the response from the source entity, the transaction authorization service may first verify that the PIN number or other identifier provided by the source entity is valid, for example by checking the identifier against an identifier provided by the source entity during a registration process for the transaction authorization service. If the PIN number or other identifier is valid, the transaction has been authorized by the source entity with the transaction authorization service via the second communications channel. The transaction authorization service may then contact the target entity to inform the target entity that the transaction is authorized. This contact may inform the target entity as to how to obtain the funds indicated by the transaction. The target entity may then complete the transaction with the transaction authorization service and the source entity. In one embodiment, if not already registered, the target entity may be required to register with the transaction authorization service to obtain an account in order to obtain the funds. If the target entity already has an account with the transaction authorization service, the transaction may be automatically performed by transferring funds from the source entity's account into the target entity's account. In this case, the contact may be to inform the target entity that the transaction has been made, and that the funds are available in the target entity's account. In some embodiments, other methods for obtaining the funds than registering with the transaction authorization service may be provided. For example, a check for the funds may be cut and mailed to the target entity, or the funds may be electronically transferred to another account (e.g., a bank account) at the request of the target entity.

Using a second communications channel to authorize a transaction initiated via a first communications channel may help to insure the security of the transaction, and of the source entity's account. Using separate communications channels for initiating transactions and authorizing transactions may help to reduce or prevent security problems such as eavesdropping. Further, the second communications channel may be specified by a telephone number, alias, or other type of address that is assigned to a particular physical device, for example a conventional phone, a cell phone, or other personal electronic device. To authorize a transaction, an entity must be in possession of the mechanism to participate on the second communication channel as well as the PIN number or other identifier used in authorizing the transaction.

BRIEF DESCRIPTION OF THE DRAWINGS

FIG. 14 illustrates an exemplary registration page for a transaction authorization service according to one embodiment.

FIG. 15 illustrates an exemplary personal account page for a transaction authorization service according to one embodiment.

Figure 1:
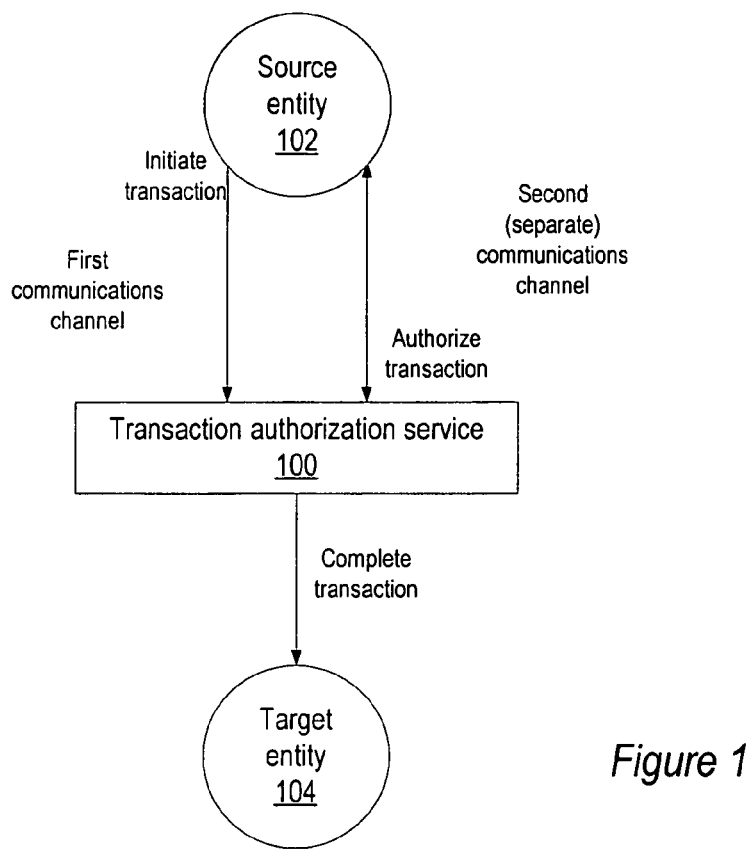
FIG. 1 illustrates a transaction authorization service according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for the authorization of transactions, such as payments or money transfers, are described. In embodiments, a transaction authorization mechanism may be provided through which a transaction initiated via a first communications channel may be authorized through a second, separate communications channel. Communications channels may include any methods or mechanisms for transmitting information between entities. Communications channels generally include protocols for information transfer (e.g., Short Message Service (SMS) for text messaging), media over or through which information is transmitted according to the protocols, and infrastructures for supporting the transmissions (e.g., cellular telephone service providers). Further, a communications channel may require devices that enable entities to communicate via the communications channel, for example a mobile phone, satellite phone, cell phone, conventional telephone, computer system, or Personal Digital Assistant (PDA). Examples of communications channels include, but are not limited to, conventional, land-based telephone systems, mobile or cellular telephone systems, satellite telephone systems, email, instant messaging (IM), Voice over IP (VoIP), and text messaging. Note that separate communications channels may share one or more of protocol, media, infrastructure, and enabling device. For example, text messaging and cellular telephone systems may be enabled through the same device (a cell phone) and may transmit over the same medium.

Note that communications on communications channels over which voice messages may be transmitted (e.g., conventional, land-based telephone systems, mobile or cellular telephone systems, satellite telephone systems, VoIP, etc.) may collectively be referred to herein as "voice communications", and likewise the channels may be referred to collectively as "voice communications channels". Further note that voice communications includes both "live" or real human voice communications and automated voice systems. Automated voice systems include automated systems in which synthesized or recorded voice messages are transmitted to communicate information. Note that some automated voice systems may transmit at least some synthesized or recorded voice messages in response to vocal input (via voice recognition technology) or other input into a communication device (e.g., numeric key pad entries).

FIG. 1 illustrates a transaction authorization service according to one embodiment. In one embodiment, a first, or source, entity 102 may initiate a transaction (e.g., a payment or money transfer) to a second, or target, entity 104 with a transaction authorization service 100 via a first communication channel, for example a telephone call via a conventional land-based telephone, a telephone call via a mobile/cellular phone, a text message initiated from a cell phone or other device capable of text messaging, an email message, or over some other communications channel.

The transaction initiation message may include information that may be used to identify the source entity 102, or may otherwise be identifiable as being from the particular entity. In some embodiments, the transaction authorization service 100 may identify the transaction initiation message as authentic (as being from the source entity) via one or more methods. For example, in one embodiment, caller ID may be used to identify the transaction initiation message as authentic. In one embodiment, the transaction initiation message may include a security phrase or other identifier known only to the source entity and to the transaction authorization service. Other methods for identifying the transaction initiation message as authentic may be used in various embodiments. The transaction initiation message may also include, but is not limited to, information identifying the target entity or entities (e.g., a telephone number, account number, email address, alias, etc.), and an amount to be paid or transferred to the target entity(s).

Before completing the transaction to the target entity 104, the transaction authorization service 100 authorizes the transaction with the source entity 102 via communications through a second and separate communications channel, for example a telephone call to a cell phone, standard telephone, PDA, or other device capable of telephone communications, via a text message to a text-message-capable device in possession of the source entity 102, or through some other communications channel. Note that the initiation of the transaction and the authorization of the transaction may be, but are not necessarily, performed by the source entity 102 using the same device (e.g., a cell phone), but that two different communications channels are used.

The communication (e.g., a message, or authorization request) from the transaction authorization service 100 via the separate communications channel may include an indication that the message is authentic (e.g., is from the transaction authorization service 100). The source entity 102 may authorize the transaction by providing a code or identifier associated with the source entity and known by the transaction authorization service 100 via the second communications channel in response to the authorization request, for example by entering a Personal Identification Number (PIN) or other identifier on the keypad of a cell phone or other device on which the authorization message was received. After receiving the response from the source entity 102 including a PIN or other identifier, the transaction authorization service 100 may verify that the PIN or other identifier provided by the source entity 102 is valid, for example by checking the provided identifier against an identifier provided by the source entity during a registration process for the transaction authorization service. If the provided PIN or other identifier is not valid, then the transaction is not considered authorized by the transaction authorization service 100. The authorization through the separate communications channel serves to securely verify that the transaction was initiated and is authorized by the source entity 102.

Note that, in various embodiments, the identifier or code entered or otherwise provided by the source entity 102 to authorize a transaction may be a PIN number (e.g., a 4-digit numeric code), some other type of alphanumeric code, a password, a pass phrase, a response to a personal question (e.g., "What is your mother's maiden name?"), or any other form of identifier that can be transmitted over a communications channel. One of ordinary skill in the art will recognize that any of a variety of types of identifiers may be used to identify a source entity. Further note that other forms of identification are possible and contemplated. As an example, some embodiments using voice communications as the separate communications channel to authenticate transactions may use voice recognition in authenticating the transactions. In these embodiments, the transaction authorization service may analyze the source entity's voice input to determine if the source entity 102 is recognized, and may then (if recognized)

ask a question along the lines of "Do you authorize this transaction?" The source entity 102 may then respond "Yes" or "No" to authorize or reject the transaction.

After the transaction has been authorized through the second communications channel, the transaction authorization service 100 may notify the target entity 104 of the transaction. The notification message may include an indication that the notification message is authentic (e.g., is from the transaction authorization service 100). The target entity 104 may then complete the transaction with the transaction authorization service 100, for example by communicating with the transaction authorization service 100 to receive a payment or a transferal of funds initiated by the first entity 102.

Note that the transaction authorization service 100 may be used to perform the actual funds transfer for the transaction, and thus may provide accounts for funds transfer to various entities which may include either one or both of source entity 102 and target entity 102, or alternatively the transaction authorization service 100 may serve as an authorization service for one or more other services that perform the actual funds transfer.

Further note that the source entity 102 and/or the target entity 104 may represent individuals or corporate entities, such as organizations, businesses, retail businesses, industrial enterprises, e-commerce businesses, governmental entities, or in general any two entities between which a transaction may take place. Further note that the transaction may be a payment for goods or services, a money or other commodity transfer, a payment or transfer for other purposes (e.g., for tax purposes), or in general any transaction involving the transferal of a commodity from one entity to another. Further note that embodiments may be used for other purposes than for authorization of transfers of commodities, for example for authorizing the scheduling, allocation, or transferal of resources, for scheduling and responding to meetings, etc.

Using a second, separate communications channel to authorize a transaction initiated via a first communications channel may help to insure the security of the transaction, and of the source entity's account. For example, if someone is somehow eavesdropping on the first communications channel used to initiate the transaction, authorizing the transaction through a second, separate communications channel may help to prevent that person from interfering with the transaction, or from gaining additional information (e.g., a PIN number or other identifier) that might allow that person access to the source entity's account. In addition, in embodiments, the second communications channel may be specified by a telephone number, alias, or other type of address that is assigned to a particular physical device, for example a conventional phone, a cell phone, or other personal electronic device. This device is, or should be, associated with and in the possession of the source entity, for example the source entity's home phone, personal cell phone or other personal electronic device. This may help to provide two form factor security for transactions. Not only must the source entity possess some knowledge (e.g., a PIN number or other identifier) that is necessary to authorize transactions, but the source entity must also be in possession of the device associated with the second communications channel (e.g. a particular cell phone associated with a cell phone number) to authorize transactions. To authorize a transaction, an entity must be in possession of the mechanism to participate on the second communication channel as well as the PIN number or other identifier used in authorizing the transaction.

Figure 2:
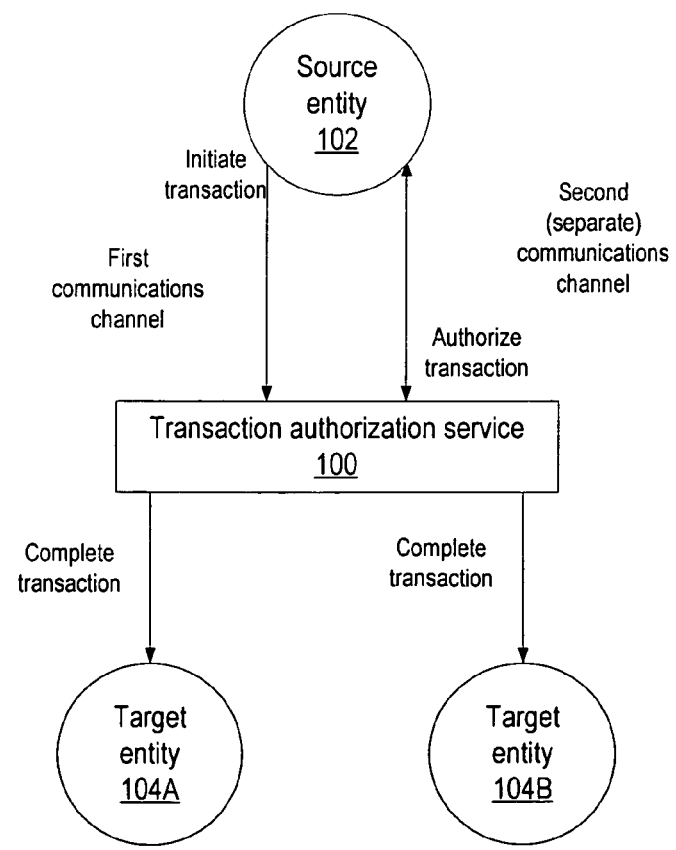
FIG. 2 illustrates a transaction authorization service that may be used to authorize a transaction directed at two or more target entities, according to one embodiment.

FIG. 2 illustrates a transaction authorization service that may be used to authorize a transaction directed at two or more target entities, according to one embodiment. In one embodiment, a first, or source, entity 102 may initiate a transaction (e.g., a payment or money transfer) to two or more target entities 104 with a transaction authorization service 100 via a first communication channel. Before completing the transaction to the target entity 104, the transaction authorization service 100 authorizes the transaction with the source entity 102 via a second and separate communications channel. The source entity 102 may authorize the transaction by providing a code or identifier known by the transaction authorization service 100 via the second communications channel in response to the authorization request, for example by entering a PIN or other identifier on the keypad of a cell phone or other device on which the authorization message was received. After receiving the response from the source entity 102 including a PIN or other identifier, the transaction authorization service 100 may verify that the PIN or other identifier provided by the source entity 102 is valid, for example by checking the provided identifier against an identifier provided by the source entity during a registration process for the transaction authorization service. If the provided PIN or other identifier is not valid, then the transaction is not considered authorized by the transaction authorization service 100. The transaction authorization service 100 may then notify the target entities 104 of the transaction. The notification messages may include indications that the notification messages are authentic (e.g., are from the transaction authorization service 100). The target entities 104 may then each separately complete the transaction with the transaction authorization service 100, for example by communicating with the transaction authorization service 100 to receive a payment or a transferal of funds initiated by the first entity 102.

Figure 3:
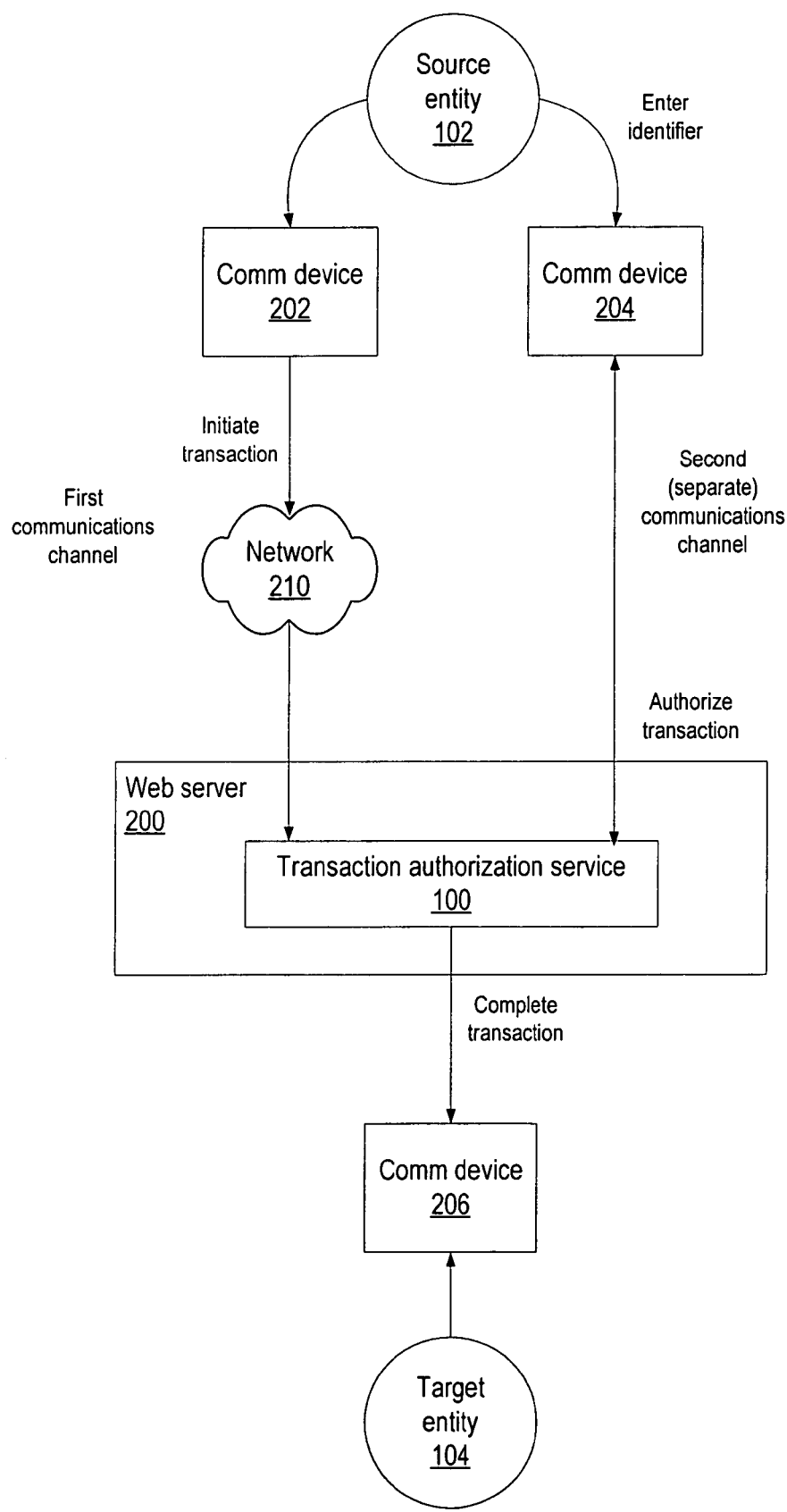
FIG. 3 illustrates a transaction authorization service implemented as a service on a web server and used to authorize a transaction, according to one embodiment.

FIG. 3 illustrates a transaction authorization service implemented as a service on a web server and used to authorize a transaction, according to one embodiment. In one embodiment, the transaction authorization service 100 may be implemented on a Web server 200 coupled to one or more networks 210 (e.g., the Internet, or web). In one embodiment, transaction authorization service 100 may be implemented as a web service that provides a web services interface via network(s) 210. In one embodiment, source entity 102 may register with the transaction authorization service 100 to set up an account. Source entity 102 may access transaction authorization service 100 via a first communications (comm.) device 202 to set up the account during the registration process. Communications device 202 may be a home or business computer, e.g. a laptop, notebook, or desktop computer, or some other device that is capable of communicating over network 210 with web server 200, for example a PDA or cell phone. In one embodiment, source entity 102 may access an account creation (registration) web page or pages provided by transaction authorization service 100 to register and set up the account using a web browser on communications device 202.

Registering with transaction authorization service 100 may include source entity 102 providing personal information (e.g., one or more of name, residence, mailing address, email address, credit card type and number, etc.). In addition, source entity 102 may provide information for use in authorizing transactions. Information provided by source entity 102 for use in authorizing transactions may include one or more of a phone number, phrase, personal password, and/or PIN number or other type of identifier. Included in this information is a specification by source entity 102 of a separate communications channel to be used in authorizing transactions. For example, in one embodiment, source entity 102 may be required to enter a phone number representing a mobile phone, cell phone or other device capable of cell telephone communications to be used as communications device 204 for authorizing transactions as represented in FIG. 3.

In one embodiment, a security phrase may be provided by entity 102 during the registration process that is to be used in verifying the authenticity of messages received by entity 102 as originating from transaction authorization service 100. The phrase may, for example, be a short English-language phrase such as "The big brown dog"; note, however, that embodiments may not restrict the content (or language) of the phrase. If a message received by entity 102 includes the phrase, known only to entity 102 and transaction authorization service 100, then entity 102 may feel secure that the message is from transaction authorization service 100. Note that the phrase may also be used to identify messages sent from entity 102 to transaction authorization service 100 as being authentic messages from entity 102. Further note that, in one embodiment, rather than entity 102 specifying the phrase, a phrase may be provided to entity 102 by transaction authorization service 100. Further note that a security phrase associated with target entity 104 may also be used for similar purposes in communications between transaction authorization service 100 and target entity 104. Note that other embodiments may not use a security phrase as described above.

In one embodiment, in addition to the information provided by source entity 102 during registration, transaction authorization service 100 may provide source entity 102 with information for use in authorizing transactions. For example, in one embodiment, rather than a registrant providing a PIN number, transaction authorization service 100 may specify a PIN number or other type of identifier for source entity 102 to use in authorizing transactions.

Note that, in one embodiment, transaction authorization service 100 may provide a mechanism or mechanisms for entity 102 to edit or change any information entered during the registration process at a later time, if necessary or desired. For example, entity 102 may change addresses, or phone numbers, or passwords, or the security phrase.

In one embodiment, the process of setting up an account with transaction authorization service 100 may include transferring funds from a financial institution (e.g., a bank, or credit card provider) into a funds account maintained by the entity that provides the transaction authorization service 100 (referred to herein as the transaction authorization service 100 provider). Note that, in another embodiment, source entity 102 may maintain funds in another account without transferring funds into a funds account maintained by the transaction authorization service 100 provider. In this embodiment, source entity 102 may use transaction authorization service 100 to authorize transactions involving funds transfers from the separately maintained funds account.

In one implementation, entity 102 may pay a fee to the transaction authorization service 100 provider for using transaction authorization service 100, for example a one-time, yearly, or monthly fee, or alternatively the transaction authorization service 100 provider may charge source entity 102 and/or target entity 104 a transaction fee per each transaction. As another alternative, transaction authorization service 100 may be provided for use at no charge.

In one embodiment, transaction authorization service 100 may provide registered entity 102 with a secure web page or pages to which entity 102 may log on and through which the entity 102 may manage the account. For example, transaction authorization service 100 may provide a user interface through which entity 102 may deposit funds into the account, for example via an electronic bank transfer. Transaction authorization service 100 may also provide a user interface whereby entity 102 may withdraw funds from the account, for example via an electronic transfer from the account to a bank account, or alternatively by mailed check. Transaction authorization service 100 may also provide a user interface whereby entity 102 may review previous transactions, view the status of pending transactions, determine account balances, and perform various other activities related to the entity's account.

After registering with transaction authorization service 100, and transferring funds into a funds account maintained by the transaction authorization service 100 provider if necessary, source entity 102 may access transaction authorization service 100 to initiate a transaction with a target entity 104. This access may be via communications device 202 over the first communications channel, or alternatively via a different communications channel and/or via a different communications device.

Transaction authorization service 100 may provide one or more mechanisms or user interfaces through which entity 102 may initiate a transaction (e.g., a transaction to send money to a specified entity or entities, such as target entity 104). In one embodiment, transaction authorization service 100 may provide a user interface on a secure web page or pages to which entity 102 may log on and through which entity 102 may initiate a transaction, for example a payment or funds transfer to target entity 104.

In one embodiment, the transaction authorization mechanism may allow users (e.g., entity 102) to enter text message commands on a communications device (e.g., a cell phone) that is text-message capable and to transmit the commands to transaction authorization service 100 at a specified address. In one embodiment, SMS (Short Message Service) may be used to provide text messaging capabilities. The following is an exemplary format for such a command, which is not intended to be limiting:

Pay <amount> to <phone number>

In the above exemplary command, <amount> represents the monetary amount to be paid, and <phone number> represents a phone number of the payee (e.g., target entity 104). Note that text message commands to initiate other types of transactions, or to initiate other functions of the transaction authorization service 100, may also be provided by transaction authorization service 100. In addition, in FIG. 3, source entity 102 may enter such a command on a communications device to initiate a transaction (e.g., a payment) with target entity 104. Source entity 102 may specify an amount to be paid and a phone number associated with target entity 104. Note that the communications device used to initiate the command may be communications device 202 or another communications device. In one embodiment, communications device 204, which is to be used to authorize transactions and for which a phone number was entered during the registration process, may also be used to initiate a transaction over a first communications channel.

Once transaction authorization service 100 receives the transaction command via a first communications channel, the service 100 may contact source entity 102, for example at a phone number specified by the source entity 102 during the registration process (i.e., over the second communications channel as illustrated in FIG. 3). The phone number may, for example, be the number of a land-based phone, cell phone or other phone-capable device in the possession of source entity 102. In FIG. 3, communications device 204 is a device (e.g., a mobile phone/cell phone or standard land-based telephone) to which is assigned the specified phone number. In one embodiment, the contact may include transmitting a text message requesting that entity 102 authorize the initiated transaction. Note that other embodiments may initiate a cell or standard telephone call with either human or automated voice messages for the authorization request message. In one embodiment, the authorization request message may include a security phrase either entered by or provided to entity 102 during registration to indicate that the message is really from transaction authorization service 100.

In one embodiment, to authorize the transaction, entity 102 may enter a PIN number or other identification code on communications device 204 in response to the authorization request message received from transaction authorization service 100 on communications device 204 via the second communications channel. For example, if entity 102 has selected a PIN number of 3419, then entity 102 may enter the PIN number "3419" (in one embodiment, followed by a # sign) on the keypad of communications device 204. One embodiment may allow entity 102 to enter a different code or command to cancel or deny the transaction if desired. Note that, in one embodiment, the PIN number or other identifier may need to be entered to verify the cancellation or denial. The response of entity 102 is then communicated to transaction authorization service 100 via the second communications channel. After receiving the response from the source entity 102 including a PIN or other identifier, the transaction authorization service 100 may verify that the PIN or other identifier provided by the source entity 102 is valid, for example by checking the provided identifier against an identifier provided by the source entity during a registration process for the transaction authorization service. If the provided PIN or other identifier is not valid, then the transaction is not considered authorized by the transaction authorization service 100.

In some embodiments, alternative methods of contacting the source entity 102 to authorize a transaction may be used. For example, transaction authorization service 100 may contact source entity 102 via some other mechanism, for example by email, requesting authorization of the transaction. Source entity 102 may then contact transaction authorization service 100 via the second communications channel using communications device 204 to authorize (or deny) the transaction, in so doing providing the PIN number or other identification code via communications device 204 to authorize the transaction or cancel/deny the transaction.

If source entity 102 authorizes the transaction via the second communications channel, transaction authorization service 100 may then contact the target entity 104 of the transaction to inform the target entity 104 of the transaction, for example using a phone number provided by source entity 102 in the message initiating the transaction as previously described. The phone number may, for example, be a phone number assigned to communications device 206, for example a cell phone, in the possession of target entity 104. In one embodiment, the message may be sent as a text message, for example of the following exemplary format, which is not intended to be limiting:

<entity 102> has paid you <amount>

In one embodiment, SMS may be used to send the text message. The message may include additional information, such as information identifying the transaction authorization service 100 and instruction describing a method or methods for the target entity 104 to receive the payment. For example, the message may also indicate something along the lines of:

Contact <transaction authorization service 100> at <URL/ phone #> to receive the payment Further note that other methods or mechanisms than text messages via device 206 may be used to inform target entity 104 of the transaction in some embodiments; for example a human or automated voice message, an email message, and/or a mailed letter may be used instead of or as an alternative to a text message.

Note that, in one embodiment, instead of or as an alternative to transaction authorization service 100 contacting target entity 104 to inform entity 104 of the transaction, source entity 102 may contact target entity 104 to inform entity 104 of the transaction. For example, in one embodiment, if target entity 104 is not a registered user of transaction authorization service 100, source entity 102 may contact target entity 104 to inform the entity that a payment has been made via transaction authorization service 100.

In one embodiment, to complete the transaction, for example to receive the money paid by source entity 102, target entity 104 may be required to log on to the web site associated with transaction authorization service 100. In one embodiment, if target entity 104 does not already have an account with transaction authorization service 100, target entity 104 may be required to register and set up an account with transaction authorization service 100 before receiving the payment. In this embodiment, transaction authorization service 100 may provide a service (authorization of transactions, and funds transfers) that is available only to registered users, whether the user is a source or target entity. In other embodiments, target entities may not be required to register with transaction authorization service 100 to receive funds from transactions initiated and authorized by source entities.

Note that, if target entity 104 already has an account with transaction authorization service 100, then the transfer of funds to the target entity's account from the source entity's account may be performed automatically without requiring any further action by target entity 104. In this case, a message from transaction authorization service 100 to target entity 104 as described above may simply inform the target entity 104 of the transaction without requiring any further action by target entity 104 to obtain the funds.

In some embodiments, instead of or as an alternative to transferring funds from the source entity's account with transaction authorization service 100 to the target entity's account with transaction authorization service 100, some other method of transferring the funds to the target entity 104 may be used. For example, the funds may be electronically transferred to a bank account as specified by target entity 104, or alternatively a check may be cut and sent to target entity 104. In one embodiment, transaction authorization service 100 may provide user interface elements whereby target entity 104 may, upon contacting transaction authorization service 100 to complete the transaction, select from among two or more methods to receive the payment from source entity 102.

In one embodiment that use text messaging as the separate communications channel to authenticate transactions, transaction authorization service 100 may record the authenticating text messages. The stored text messages may then be used, for example, as a record of activity for the source entity's account. In one embodiment, for example, the transaction authorization service 100 may provide an interface via which source entity 102 may view a history of authenticating text messages. Note that a similar method of recordation may be used for embodiments that use other communications channels to authenticate transactions. Further note that, in one embodiment, transaction authorization service 100 may periodically or aperiodically generate reports for accounts, including transaction histories, and may provide those reports to source entities 102 via one or more mechanisms.

Figure 4:
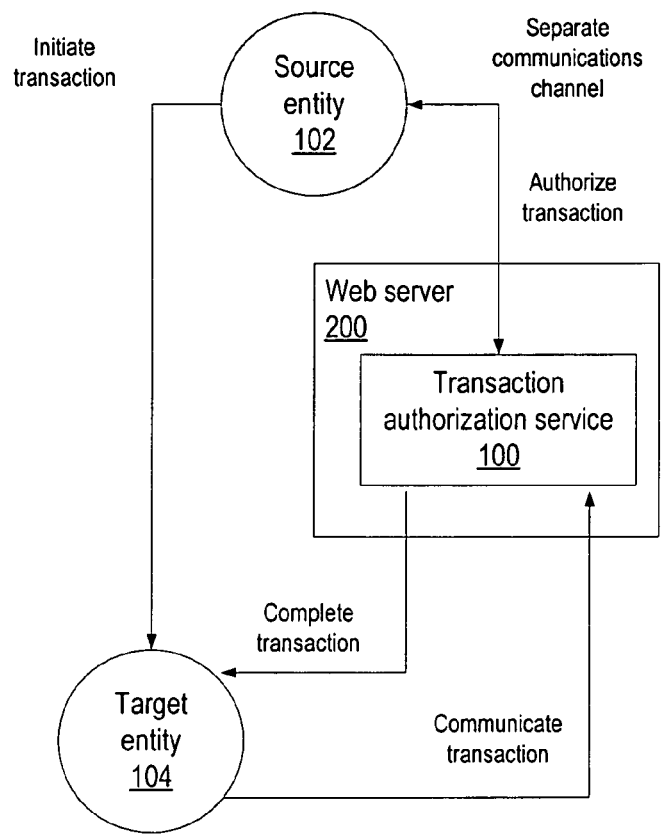
FIG. 4 illustrates a transaction authorization service implemented as a service on a web server and used to authorize transactions with a third party such as an e-commerce web site, according to one embodiment.

FIG. 4 illustrates a transaction authorization service implemented as a service on a web server which may be used by third parties such as e-commerce web sites or other vendors as a payment method, according to one embodiment. In this example, instead of the source entity 102 communicating directly with transaction authorization service 100 to initiate a transaction via a first communications channel, source entity 102 communicates directly with target entity 104 to initiate the transaction. For example, target entity 104 may be an e-commerce web site that allows source entity 102 to use transaction authorization service 100 as a payment method for transactions (e.g., purchases) made via the site. As part of registering with the e-commerce web site, entity 102 may provide account information with transaction authorization service 100 that enables the e-commerce web site to initiate a funds transfer from entity 102's account with transaction authorization service 100. Alternatively, this information may be provided at the time of purchase. Note that target entity 104 may also be registered with transaction authorization service 100, and may have an account with transaction authorization service 100. In one embodiment, transaction authorization service 100 may assign each registered target entity a unique identifier that, for example, may be used in communications with transaction authorization service 100 to identify the target entity 104.

As another example, the target entity 104 may be a secured web site or other secured application that requires the source entity 102 to log into an account, and the transaction may be a login attempt. In this example, the transaction authorization service 100 may be used to authorize the login with the source entity 102 via a separate communications channel. Note that this exemplary use for transaction authorization service 100 provides added security in that, even if a source entity's account information and password for the secured application are stolen or otherwise obtained by a third party, the third party would not be able to access the account without validated authorization by the source entity 102 through the separate communications channel and the transaction authorization service 100. This would require either that the third party be in possession of the communications device (e.g., a cell phone) associated with the separate communications channel (e.g., a cell phone number) and the PIN or other identifier that has to be entered to authorize the transaction, or that the source entity 102 is made aware of and authorizes the access of the account by the third party.

The initiation of the transaction with target entity 104 by source entity 102 may be performed via any of a number of communications channels. For example, the initiation of the transaction may be communicated via a text message from source entity 102 to target entity 104, via communications over a voice communications channel (e.g., a phone call), via an email message, etc. In one embodiment, as mentioned above, the initiation of the transaction may be performed via a Web interface to the target entity 104, for example by source entity 102 selecting an item for purchase from a page of an e-commerce web site.

When entity 102 initiates a transaction with target entity 104, e.g. initiates a purchase from an e-commerce web site, target entity 104 communicates with transaction authorization service 100 to communicate the transaction and initiate the actual funds transfer. The communication may include, but is not limited to, information identifying the target entity 104, information identifying the source entity 102, and the amount to be transferred to target entity 104. The communications may also include other information, such as information identifying a communications channel to be used to authorize the transaction with the source entity (e.g., a phone number). In one embodiment, transaction authorization service 100 may be implemented as a web service that provides a web service interface through which target entity 104 (e.g., an e-commerce web site application) may communicate with transaction authorization service 100 to initiate a transaction.

Once transaction authorization service 100 receives the communication from target entity 104 initiating a funds transfer, the service 100 may contact source entity 102, for example at a phone number or other communications channel specified by the source entity 102 during the registration process (i.e., over the second communications channel as illustrated in FIG. 3) or alternatively via a communications channel indicated in the communications received from target entity 104. The phone number may, for example, be the number of a land-based phone, cell phone or other phone-capable device in the possession of source entity 102. In one embodiment, the contact may include transmitting a text message requesting that entity 102 authorize the initiated transaction. Note that other embodiments may initiate a cell or standard telephone call with either human or automated voice messages for the authorization request message. In one embodiment, the authorization request message may include a security phrase either entered by or provided to entity 102 during registration to indicate that the message is really from transaction authorization service 100.

In one embodiment, to authorize the transaction, entity 102 may enter a PIN number or other identification code on a communications device (e.g., a land-based phone or cell phone) in response to the authorization request message received from transaction authorization service 100 via the second communications channel. In one embodiment, entity 102 may enter a different code or command to cancel or deny the transaction if desired. Note that, in one embodiment, the PIN number or other identifier may need to be entered to verify the cancellation or denial. The response of entity 102 is then communicated to transaction authorization service 100 via the second communications channel. After receiving the response from the source entity 102 including a PIN or other identifier, the transaction authorization service 100 may verify that the PIN or other identifier provided by the source entity 102 is valid, for example by checking the provided identifier against an identifier provided by the source entity during a registration process for the transaction authorization service. If the provided PIN or other identifier is not valid, then the transaction is not considered authorized by the transaction authorization service 100.

In some embodiments, alternative methods of contacting the source entity 102 to authorize a transaction may be used. For example, transaction authorization service 100 may contact source entity 102 via some other mechanism, for example by email, requesting authorization of the transaction. Source entity 102 may then contact transaction authorization service 100 via the second communications channel and communications device to authorize (or deny) the transaction, in so doing providing the PIN number or other identification code via the communications device to authorize the transaction or cancel/deny the transaction.

If source entity 102 authorizes the transaction via the second communications channel and communications device, then transaction authorization service 100 may complete the transaction with target entity 104, for example by electronically transferring funds from the source entity's account to an account specified by target entity 104. Note that the target entity's account may be an account with the transaction authorization service 100 or, alternatively, an account with a different entity, such as a bank. Note that target entity 104 may not complete the transaction with source entity 102 (e.g., may not OK a purchase order for processing) until the transaction with transaction authorization service 100 is completed.

If the transaction was successfully completed by transaction authorization service 100, transaction authorization service 100 may communicate with target entity 104 to indicate the successful completion of the transaction. In one embodiment, the communications from transaction authorization service 100 to target entity 104 may include other information relevant to the source entity 102 and the transaction, such as a shipping address for source entity 102. If the transaction was not authorized by source entity 102, or the authorization was determined to be invalid by transaction authorization service 100, transaction authorization service 100 may communicate with target entity 104 to indicate that the transaction was not completed, and may include in the communication information describing the reason.

Figure 5:
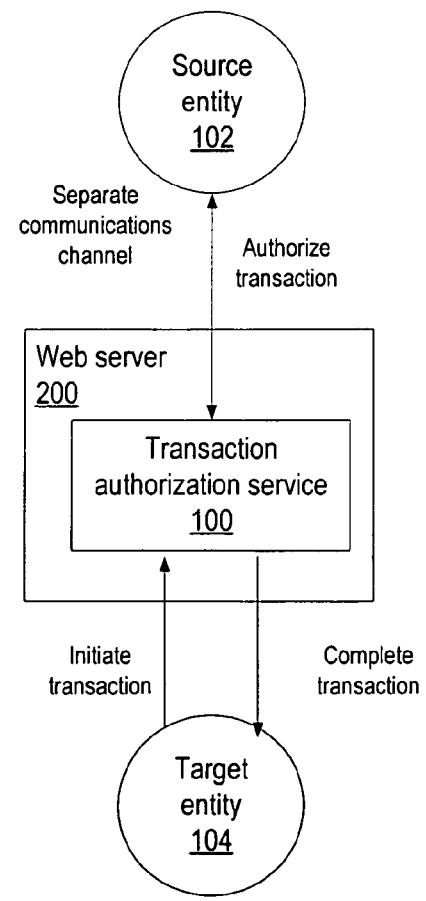
FIG. 5 illustrates a transaction authorization service in which a target entity communicates with a transaction authorization service to initiate a transaction with a source entity, according to one embodiment.

FIG. 5 illustrates a transaction authorization service in which a target entity communicates with a transaction authorization service to initiate a transaction with a source entity, according to one embodiment. In this example, instead of the source entity 102 communicating with transaction authorization service 100 or target entity 104 to initiate a transaction, target entity 104 communicates with transaction authorization service 100 to initiate a transaction with source entity 102. This embodiment may be used, for example, to enable the target entity 104 to request a payment from the source entity 102, while allowing the source entity 102 to authorize the payment.

Target entity 104 may register with transaction authorization service 100, and may thus have an account with transaction authorization service 100. Source entity 102 may also have an account with transaction authorization service 100. Target entity 104 may communicate with transaction authorization service 100 to initiate a transaction with source entity 102 over a communications channel (e.g., a voice message over a telephone system, a text message, an email, etc.). The communication may include, but is not limited to, information identifying the source entity 102 and an amount that the target entity 104 is requesting to be transferred to the target entity 104 by the source entity 102. The information identifying the source entity 102 may also include information identifying a communications channel to be used to contact the source entity 102 to authorize the transaction.

Once transaction authorization service 100 receives the communication from target entity 104 initiating a transaction, the service 100 may contact source entity 102, for example at a phone number or other communications channel specified by the source entity 102 during the registration process, or alternatively via a communications channel indicated in the communications received from target entity 104. The phone number may, for example, be the number of a land-based phone, cell phone or other phone-capable device in the possession of source entity 102. In one embodiment, the contact may include transmitting a text message requesting that entity 102 authorize the initiated transaction. Note that other embodiments may initiate a cell or standard telephone call with either human or automated voice messages for the authorization request message. In one embodiment, the authorization request message may include a security phrase either entered by or provided to source entity 102 during registration to indicate that the message is from transaction authorization service 100.

In one embodiment, to authorize the transaction, entity 102 may enter a PIN number or other identification code on a communications device (e.g., a land-based phone or cell phone) in response to the authorization request message received from transaction authorization service 100 via the second communications channel. In one embodiment, entity 102 may enter a different code or command to deny the transaction if desired. Note that, in one embodiment, the PIN number or other identifier may need to be entered to verify the cancellation or denial. The response of entity 102 is then communicated to transaction authorization service 100 via the second communications channel. After receiving the response from the source entity 102 including a PIN or other identifier, the transaction authorization service 100 may verify that the PIN or other identifier provided by the source entity 102 is valid, for example by checking the provided identifier against an identifier provided by the source entity during a registration process for the transaction authorization service. If the provided PIN or other identifier is not valid, then the transaction is not considered authorized by the transaction authorization service 100.

In some embodiments, alternative methods of contacting the source entity 102 to authorize a transaction may be used. For example, transaction authorization service 100 may contact source entity 102 via some other mechanism, for example by email, requesting authorization of the transaction. Source entity 102 may then contact transaction authorization service 100 via a second, separate communications channel and communications device to authorize (or deny) the transaction, in so doing providing the PIN number or other identification code via the communications device to authorize the transaction or deny the transaction.

If source entity 102 authorizes the transaction, then transaction authorization service 100 may complete the transaction with target entity 104, for example by electronically transferring funds from the source entity's account to an account specified by target entity 104. Note that the target entity's account may be an account with the transaction authorization service 100 or, alternatively, an account with a different entity, such as a bank.

If the transaction was successfully completed by transaction authorization service 100, transaction authorization service 100 may communicate with target entity 104 to indicate the successful completion of the transaction. If the transaction was not authorized by source entity 102, or the authorization was determined to be invalid by transaction authorization service 100, transaction authorization service 100 may communicate with target entity 104 to indicate that the transaction was not completed, and may include in the communication information describing the reason.

The embodiment illustrated in FIG. 5 may be used, for example, to implement a periodic or aperiodic payment system in which the payer (the source entity 102) authorizes each payment to the payee (the target entity 104). For example, target entity 104 may be a merchant or other enterprise, and source entity 102 may be a customer of the enterprise that purchases goods or services from the enterprise. The source entity 102 and target entity 104 may agree that payments for the goods or services are to be made on a periodic schedule (e.g., monthly). Each period, target entity 104 may initiate a transaction by communicating with transaction authorization service 100, as described above. Before completing the transaction, transaction authorization service 100 first contacts source entity 102 on a separate communications channel to authorize (or deny) the transaction, as described above. Note that, in addition to providing a secure method for authorizing payments from an account, this gives the source entity 102 control over whether target entity 104 is paid, for example in cases of disputes such as the target entity 104 not performing a service as stipulated in a contract.

As another example, source entity 102 may have an account with transaction authorization service 100. Target entity 104 may be an entity to which source entity 102 may wish to provide funds as needed or desired by target entity 104. To obtain funds from target entity 104, source entity 102 initiates a transaction with transaction authorization service 100. Before completing the transaction, transaction authorization service 100 first contacts source entity 102 on a separate communications channel to authorize (or deny) the transaction, as described above. For example, parents (source entity 102) may have an account to provide funds to a college student (target entity 104). However, rather than letting the college student obtain funds without control, transaction authorization service 100 allows the parents to authorize each transaction.

Note that, in one embodiment, transaction authorization service 100 may be implemented as component of an e-commerce web site or other web application's software. In this embodiment, transaction authorization service 100 may be used by other components of the web application to authorize transactions. Further note that, in one embodiment, transaction authorization service 100, as represented in any of the Figures, may be implemented as a web service that provides a web services interface to web applications. In this embodiment, various web applications (associated with target and/or source entities) may be programmed to access the transaction authorization service 100 via the web services interface to utilize the transaction authorization service 100 to initiate and/or authorize transactions as illustrated in the Figures and described herein. Further, note that the web services interface may act as a communications channel in various embodiments. As an example, a source entity 102 may communicate with transaction authorization service 100 via a web services interface and according to a web services interface protocol to initiate a transaction. Transaction authorization service 100 may then communicate with source entity 102 via a second, separate communications channel (e.g., via a phone call to a cell phone, or via text messaging) to authenticate the transaction. As another example, source entity 102 may communicate with target entity 104 via a communications channel (e.g., text messaging, or via a web page) to purchase an item or service. Target entity 104 may then communicate with transaction authorization service 100 via a web services interface to initiate a transaction with source entity 102. Transaction authorization service 100 may then communicate with source entity 102 through a separate communications channel (e.g., through a call to a cellular telephone associated with the source entity 102) to authorize the transaction. Once authorized, the transaction authorization service 100 may communicate with target entity 104 via the web services interface to complete the transaction.

The above drawings and descriptions thereof generally describe the transaction authorization mechanism, including the notion of two communications channels (a first communications channel used to initiate a transaction, and a second communications channel used to authorize the transaction; for example, see FIG. 3). As previously described, various embodiments may use different communications mechanisms, for example voice communications (e.g., conventional telephone systems, mobile/cellular phone systems, etc.), text messaging systems (e.g., SMS), or other communications systems or mechanisms as communications channels.

In some embodiments, voice or telephone systems may be used as the second, separate communications channel for authorizing transactions. In these embodiments, a transaction may, for example, be initiated by a source entity 102 via a first communications channel, which may, for example, be one of a voice communication channel (e.g., telephone), text messaging, email, or a web page user interface. Note that other communications channels may be used to initiate a transaction. The transaction may then be authorized via the second communications channel (a voice, or telephone, channel, such a conventional telephone, cell telephone, VoIP, etc.). The authorization message may, for example, be directed to a conventional or cellular telephone associated with a phone number provided by the source entity 102. The transaction authorization service 100 may call the telephone number, identify the message as authentic (for example, via a security phrase), describe the transaction, and request authorization. Note that the telephone call may be automated or initiated by a human, and the communications may be via a "live" human voice or via an automated message. The source entity 102 may then enter or otherwise provide a PIN number or other identifier to authorize the transaction. Note that, in some embodiments, the source entity 102 may reply to the authorization message at a later time, and/or through some other communications channel (e.g., through a text message or email message).

Figure 6A:
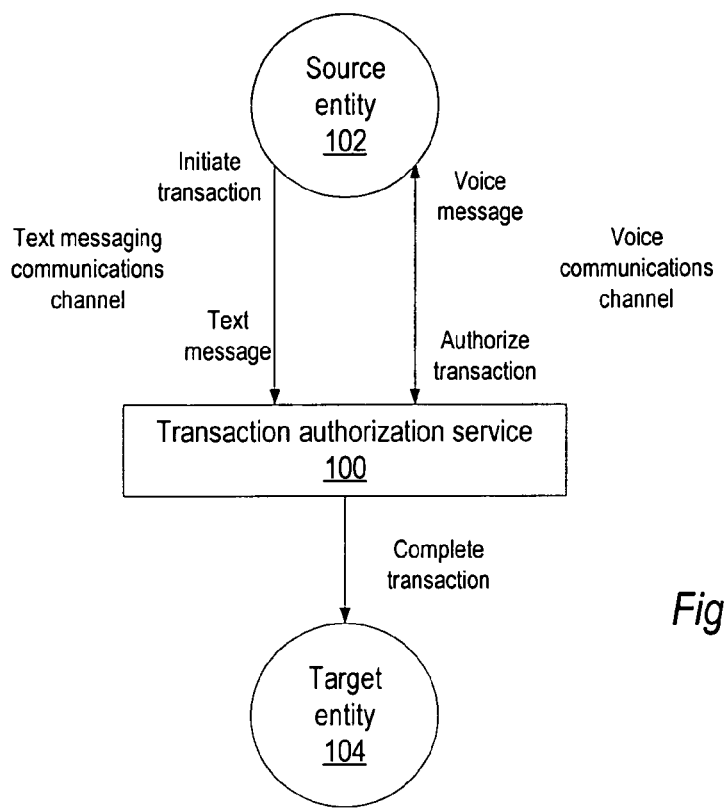
FIG. 6A illustrates an embodiment of a transaction authorization service in which text messaging is employed as a first communications channel, and a voice communications channel is employed as the second, separate communications channel.

FIG. 6A illustrates an embodiment of a transaction authorization service in which text messaging is employed as a first communications channel, and a voice communications channel is employed as the second, separate communications channel. In this embodiment, a transaction may be initiated by source entity 102 via a text message to transaction authorization service 100. The transaction may then be authorized via the voice communications channel. The transaction authorization service 100 may, for example, call a telephone number associated with source entity 102, identify the message as authentic (for example, via a security phrase), describe the transaction, and request authorization. Note that the telephone call may be automated or initiated by a human, and the communications may be via a "live" human voice or via an automated telephone system. The source entity 102 may then enter or otherwise provide a PIN number or other identifier to authorize the transaction.

Figure 6B:
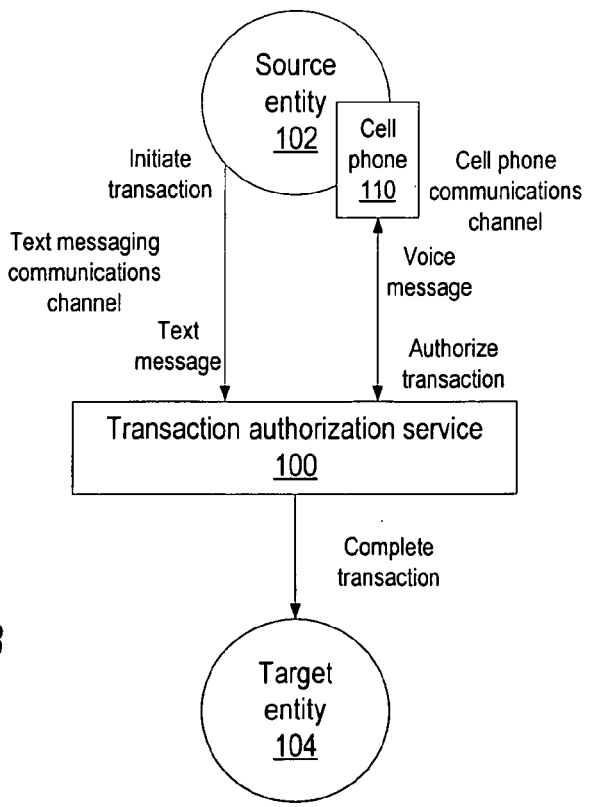
FIG. 6B illustrates an embodiment of a transaction authorization service in which text messaging is employed as a first communications channel, and a cellular telephone communications channel is employed as the second, separate communications channel.

FIG. 6B illustrates an embodiment of a transaction authorization service in which text messaging is employed as a first communications channel, and a cellular telephone communications channel and cellular telephone-capable device is employed as the second, separate communications channel. In this embodiment, a transaction may be initiated by source entity 102 via a text message to transaction authorization service 100. The transaction may then be authorized via the cellular telephone communications channel. The transaction authorization service 100 may, for example, call a telephone number associated with a cell phone 110 associated with source entity 102, identify the message as authentic (for example, via a security phrase), describe the transaction, and request authorization. Note that the cellular telephone call may be automated or initiated by a human, and the communications may be via a "live" human voice or via an automated telephone system. The source entity 102 may then enter or otherwise provide a PIN number or other identifier on cell phone 110 to authorize the transaction.

In other embodiments, text messaging systems may be used as the second, separate communications channel. An exemplary text messaging system that may be used is SMS (Short Message Service). In these embodiments, a transaction may, for example, be initiated by a source entity 102 via a first communications channel, which may, for example, be one of a voice communication channel (e.g., telephone), text messaging, email, or a web page user interface. Note that other communications channels may be used to initiate a transaction. The transaction may then be authorized via the second communications channel (text messaging). The authorization text message may be directed to a text message-capable device associated with a phone number, alias, or other identifier or address provided by the source entity 102. The transaction authorization service 100 may send the text message to the provided phone number, alias, or other identifier. The text message may include information that identifies the message as authentic (for example, a security phrase), may include information identifying the transaction, and may request authorization of the transaction. The source entity 102 may then reply to the authorization request text message with a text message including a PIN number or other identifier to authorize the transaction. Note that, in some embodiments, the source entity 102 may reply to the authorization text message at a later time, and/or through some other communications channel (e.g., through a telephone call or email message).

Figure 7:
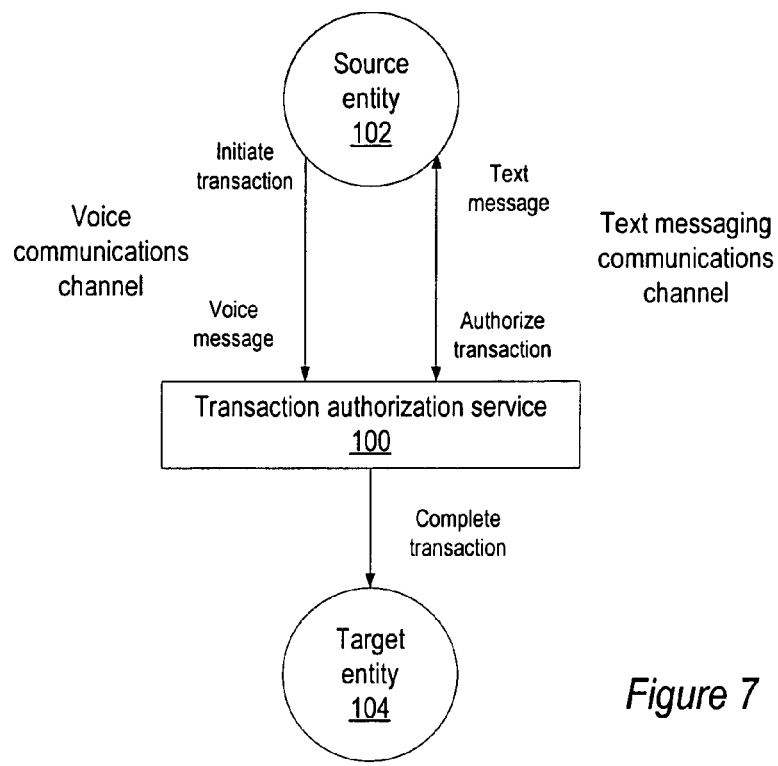
FIG. 7 illustrates an embodiment of a transaction authorization service in which a voice communications channel is employed as a first communications channel, and text messaging is employed as the second, separate communications channel.

FIG. 7 illustrates an embodiment of a transaction authorization service in which a voice communications channel is employed as a first communications channel, and text messaging is employed as the second, separate communications channel. In this embodiment, a transaction may be initiated by a source entity 102 via a voice communication channel (e.g., cell or conventional telephone). The transaction may then be authorized via text messaging as the second, separate communications channel. The authorization text message may be directed to a text message-capable device associated with a phone number, alias, or other identifier or address provided by the source entity 102. The transaction authorization service 100 may send the text message to the provided phone number, alias, or other identifier. The text message may include information that identifies the message as authentic (for example, a security phrase), may include information identifying the transaction, and may request authorization of the transaction. The source entity 102 may then reply to the authorization request text message with a text message including a PIN number or other identifier to authorize the transaction.

As described above for FIG. 4, in one embodiment, instead of the source entity 102 communicating directly with transaction authorization service 100 to initiate a transaction, source entity 102 may communicate directly with target entity 104 to initiate the transaction, target entity 104 may communicate the transaction to transaction authorization service 100, and transaction authorization service 100 may authenticate the transaction with source entity 102. For example, target entity 104 may be an e-commerce web site that allows source entity 102 to use transaction authorization service 100 as a payment method for transactions (e.g., purchases) made via the site. Various embodiments may use different communications mechanisms, for example voice communications (e.g., conventional telephone systems, mobile/cellular phone systems, etc.), text messaging systems (e.g., SMS), a web services interface, or one or more of other communications systems or mechanisms as communications channels for communications between source entity 102 and target entity 104, between target entity 104 and transaction authorization service 100, and between transaction authorization service 100 and source entity 102.

Figure 8:
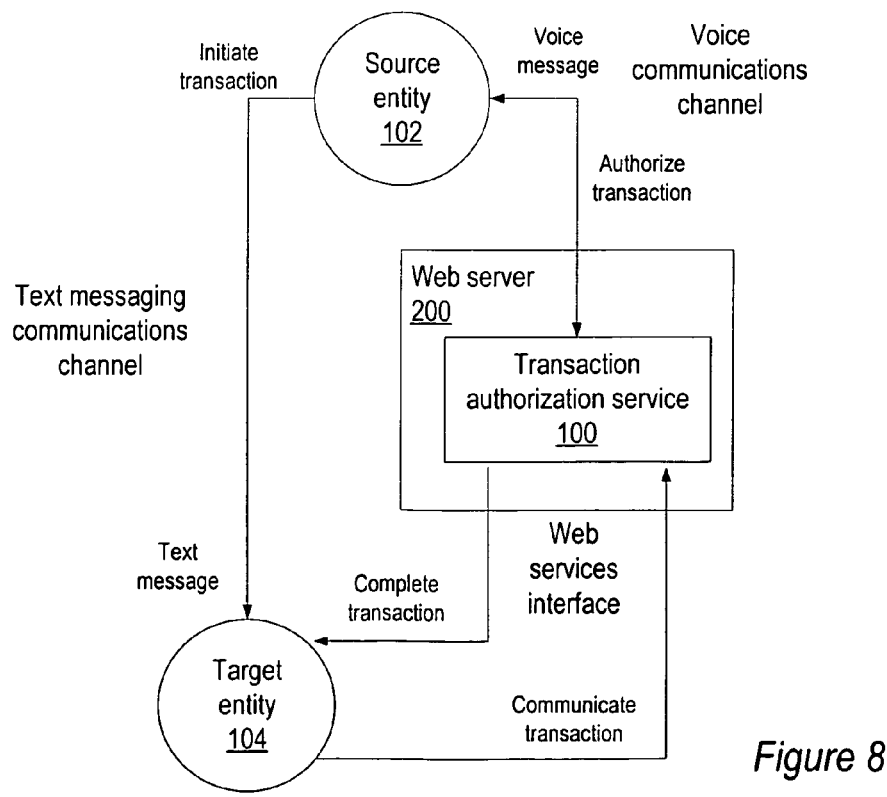
FIG. 8 illustrates an embodiment of a transaction authorization service in which a source entity communicates with a target entity via text messaging, in response to which the target entity communicates with a transaction authorization service via a web services interface to initiate a transaction with the source entity, and the transaction authorization service authorizes the transaction via a voice communications channel.

FIG. 8 illustrates an exemplary embodiment of a transaction authorization service in which a source entity communicates with a target entity via text messaging, in response to which the target entity communicates with a transaction authorization service via a web services interface to initiate a transaction with the source entity, and the transaction authorization service authorizes the transaction via a voice communications channel. In this embodiment, a text messaging communications channel is used for communications between source entity 102 and target entity 104 to initiate a transaction, a web services interface is used for communications between target entity 104 and transaction authorization service 100 to communicate the transaction to transaction authorization service 100 (and to complete the transaction once authorized), and a voice communications channel is used for communications between transaction authorization service 100 and source entity 102 to authorize the transaction.

Figure 9:
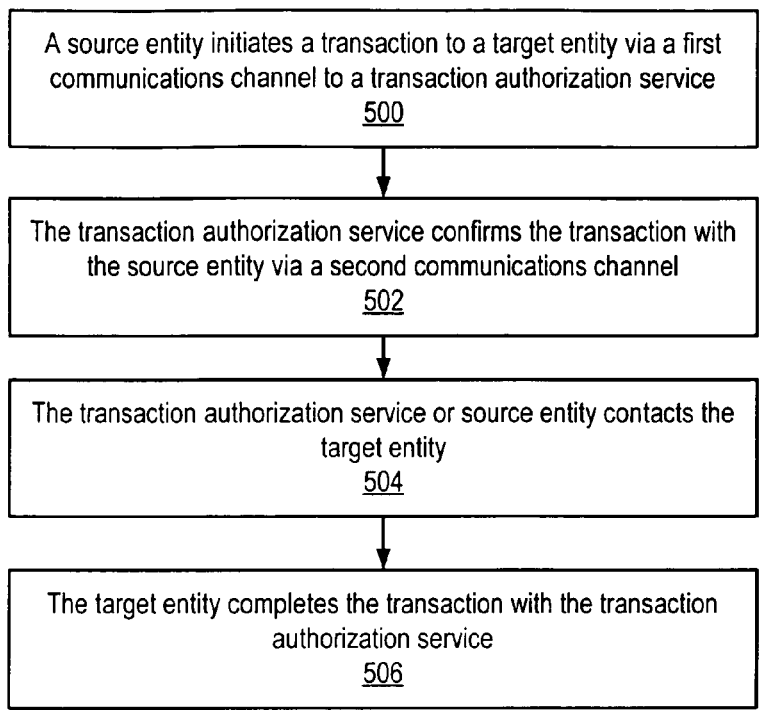
FIG. 9 is a flowchart of a method for authorization of transactions according to one embodiment.
Figure 10:
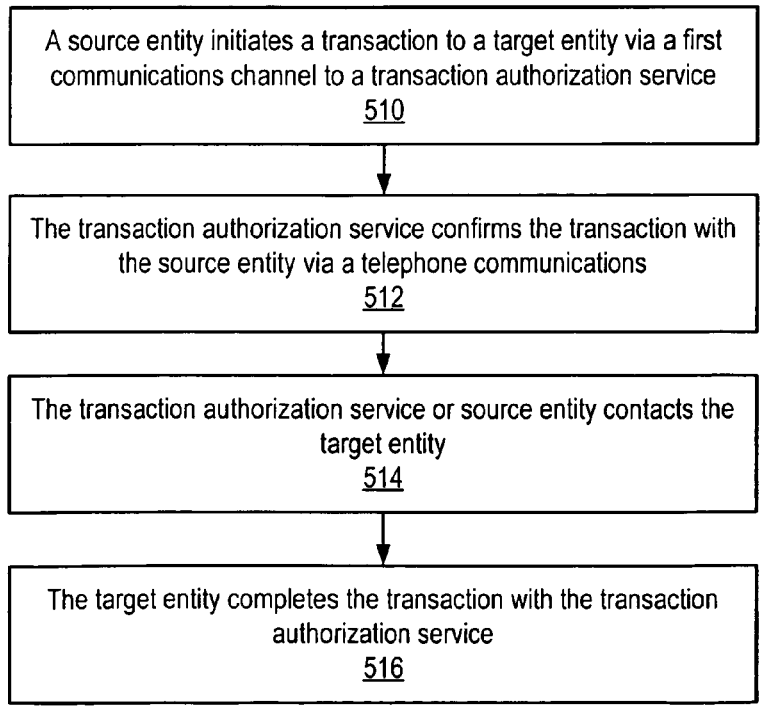
FIG. 10 is a flowchart of a method for telephone authorization of transactions according to one embodiment.
Figure 11:
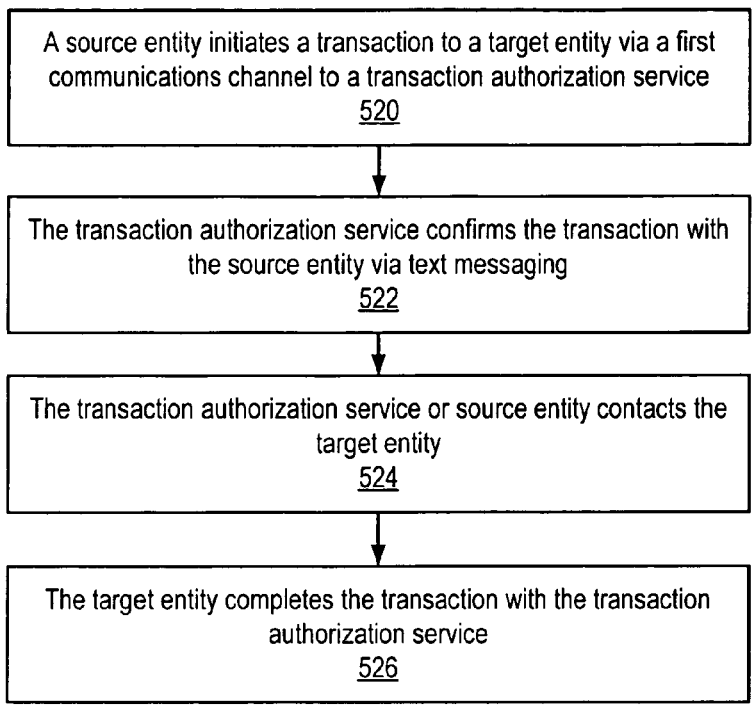
FIG. 11 is a flowchart of a method for authorization of transactions using text messaging according to one embodiment.
Figure 12:
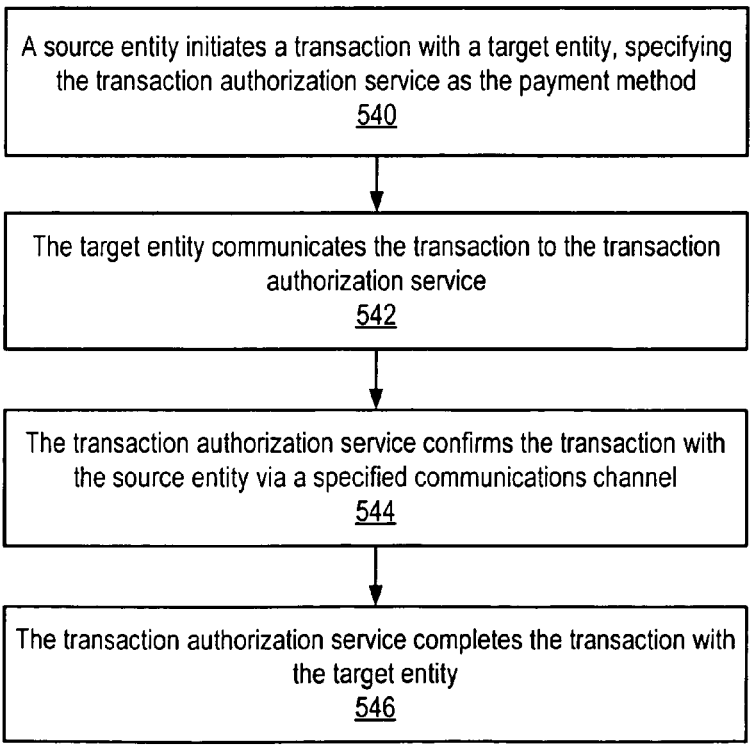
FIG. 12 illustrates a method for authorization of transactions in which a source entity initiates a transaction directly with a target entity according to one embodiment.
Figure 13:
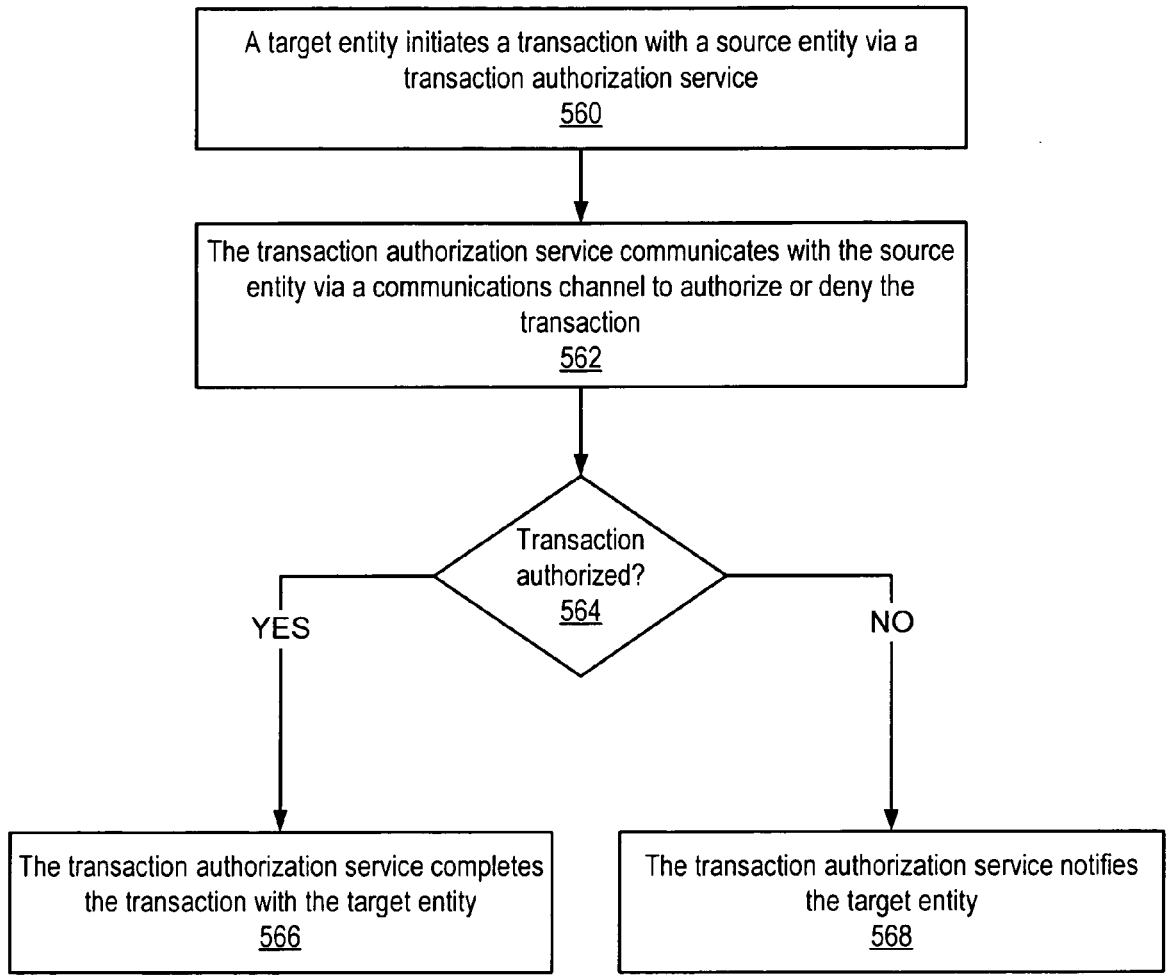
FIG. 13 illustrates a method for authorization of transactions in which a target entity communicates with a transaction authorization service to initiate a transaction with a source entity according to one embodiment.

FIGS. 9 through 13 are flowcharts of methods for authorization of transactions according to various embodiments. FIGS. 9 through 11 illustrate a source entity initiating a transaction with a target entity through a transaction authorization service according to various embodiments. FIG. 9 illustrates a general method for authorization of transactions between entities according to various embodiments. FIG. 10 illustrates a method for telephone authorization of transactions according to one embodiment, while FIG. 11 illustrates a method for authorization of transactions using text messaging according to one embodiment. While FIGS. 9 through 11 illustrate a source entity initiating a transaction through a transaction authorization service, FIG. 12 illustrates a method for authorization of transactions in which a source entity initiates a transaction directly with a target entity according to one embodiment, and FIG. 13 illustrates a method for authorization of transactions in which a target entity communicates with a transaction authorization service to initiate a transaction with a source entity according to one embodiment.

FIG. 9 is a flowchart of a method for authorization of transactions according to one embodiment. As indicated at 500, a source entity initiates a transaction to a target entity via a first communications channel to a transaction authorization service. The transaction initiation message may include information that may be used to identify the source entity, or may otherwise be identifiable as being from the particular entity. In some embodiments, the transaction authorization service may identify the transaction initiation message as authentic (as being from the source entity) via one or more methods. For example, in one embodiment, caller ID may be used to identify the transaction initiation message as authentic. In one embodiment, the transaction initiation message may include a security phrase or other identifier known only to the source entity and to the transaction authorization service. Other methods for identifying the transaction initiation message as authentic may be used in various embodiments. The transaction initiation message may also include, but is not limited to, information identifying the target entity or entities (e.g., a telephone number, account number, email address, alias, etc.), and an amount to be paid or transferred to the target entity(s).

As indicated at 502, in response to receiving a valid transaction initiation message, the transaction authorization service may confirm the transaction with the source entity via a second communications channel. As previously described, various embodiments may use different communications mechanisms, for example conventional telephone systems, mobile/cellular phone systems, and text messaging systems (e.g., SMS), as the second communications channel. The transaction authorization service may initiate a communications with a device associated with the second communications channel (e.g., a conventional telephone, a cell phone, a PDA, etc.) that is in the possession of the source entity. The communications may include information identifying the message as authentic (for example, a security phrase), may identify the transaction, and may request authorization of the transaction. To authorize the transaction, the source entity may provide a PIN number or other identifier via the second communications channel in response to the communications. Note that, in some embodiment, the source entity may reply to the authorization text message at a later time, and/or through some other communications channel (e.g., through a text message or email message). Further note that embodiments may provide a mechanism or mechanisms whereby the source entity may cancel or deny the transaction. After receiving the response from the source entity including a PIN or other identifier, the transaction authorization service may verify that the PIN or other identifier provided by the source entity is valid, for example by checking the provided identifier against an identifier provided by the source entity during a registration process for the transaction authorization service. If the provided PIN or other identifier is not valid, then the transaction is not considered authorized by the transaction authorization service.

As indicated at 504, after the transaction has been authorized with the source entity via the second communications channel, the transaction authorization service and/or the source entity may contact the target entity to inform the target entity of the transaction. This contact may inform the target entity as to how to obtain the funds indicated by the transaction. As indicated at 506, the target entity may then complete the transaction with the transaction authorization service. In one embodiment, if not already registered, the target entity may be required to register with the transaction authorization service to obtain an account in order to obtain the funds. Note that, in one embodiment, a temporary account may be created to hold the funds until the target entity registers. If the target entity already has an account with the transaction authorization service, the transaction may be automatically performed by transferring funds from the source entity's account into the target entity's account. In this case, the contact may be to inform the target entity that the transaction has been made, and that the funds are available in the target entity's account. In some embodiments, other methods for obtaining the funds than registering with the transaction authorization service may be provided. For example, a check for the funds may be cut and mailed to the target entity, or the funds may be electronically transferred to another account (e.g., a bank account) at the request of the target entity.

FIG. 10 is a flowchart of a method for telephone authorization of transactions according to one embodiment. This method is similar to that described in FIG. 9, except that the second communications channel used to authorize the transaction is a telephone communications channel. As indicated at 510, a source entity initiates a transaction to a target entity via a first communications channel to a transaction authorization service. As indicated at 512, in response to receiving a valid transaction initiation message, the transaction authorization service may confirm the transaction with the source entity via a telephone communications channel (the second communications channel). The authorization message may be directed to a conventional or cellular telephone associated with a phone number provided by the source entity. The transaction authorization service may call the telephone number, may identify the message as authentic (for example, via a security phrase), identify the transaction, and request authorization. Note that the telephone call may be automated or initiated by a human. The source entity may then enter or otherwise provide a PIN number or other identifier to authorize the transaction. After receiving the response from the source entity including a PIN or other identifier, the transaction authorization service may verify that the PIN or other identifier provided by the source entity is valid, for example by checking the provided identifier against an identifier provided by the source entity during a registration process for the transaction authorization service. If the provided PIN or other identifier is not valid, then the transaction is not considered authorized by the transaction authorization service. As indicated at 514, after the transaction has been authorized with the source entity via the telephone communications channel, the transaction authorization service and/or the source entity may contact the target entity to inform the target entity of the transaction. As indicated at 516, the target entity may then complete the transaction with the transaction authorization service.

FIG. 11 is a flowchart of a method for authorization of transactions using text messaging according to one embodiment. This method is similar to that described in FIG. 9, except that the second communications channel used to authorize the transaction is text messaging. SMS (Short Message Service) is an exemplary text messaging protocol or system that may be used in embodiments. As indicated at 520, a source entity initiates a transaction to a target entity via a first communications channel to a transaction authorization service. As indicated at 522, in response to receiving a valid transaction initiation message, the transaction authorization service may confirm the transaction with the source entity via text messaging (the second communications channel). The authorization text message may be directed to a text message-capable device associated with a phone number, alias, or other identifier or address provided by the source entity. The transaction authorization service may send the text message to the provided phone number, alias, or other identifier. The text message may include information that identifies the message as authentic (for example, a security phrase), may include information identifying the transaction, and may request authorization of the transaction. The source entity may then reply to the authorization request text message with a text message including a PIN number or other identifier to authorize the transaction. After receiving the response from the source entity including a PIN or other identifier, the transaction authorization service may verify that the PIN or other identifier provided by the source entity is valid, for example by checking the provided identifier against an identifier provided by the source entity during a registration process for the transaction authorization service. If the provided PIN or other identifier is not valid, then the transaction is not considered authorized by the transaction authorization service. As indicated at 524, after the transaction has been authorized with the source entity via text messaging, the transaction authorization service and/or the source entity may contact the target entity to inform the target entity of the transaction. As indicated at 526, the target entity may then complete the transaction with the transaction authorization service.

FIG. 12 illustrates a method for authorization of transactions in which a source entity initiates a transaction directly with a target entity according to one embodiment. As indicated at 540, a source entity initiates a transaction with a target entity, specifying the transaction authorization service as the payment method. Instead of the source entity communicating directly with the transaction authorization service to initiate the transaction, the source entity communicates directly with the target entity to initiate the transaction. For example, the target entity may be an e-commerce web site that allows the source entity to use the transaction authorization service as a payment method for transactions (e.g., purchases) made via the site. As part of registering with the e-commerce web site, the source entity may provide account information with the transaction authorization service that enables the e-commerce web site to initiate a funds transfer from the source entity's account with the transaction authorization service 100. Alternatively, this information may be provided at the time of purchase. Note that the target entity may also be registered with the transaction authorization service, and may have an account with transaction authorization service 100. In one embodiment, the transaction authorization service may assign each registered target entity a unique identifier that, for example, may be used in communications with the transaction authorization service to identify the target entity.

As indicated at 542, the target entity communicates the transaction to the transaction authorization service to initiate the funds transfer. The communication may include, but is not limited to, information identifying the target entity (e.g., the unique identifier), information identifying the source entity, and the amount to be transferred to the target entity. The communications may also include other information, such as information identifying a communications channel to be used to authorize the transaction with the source entity (e.g., a phone number). In one embodiment, the transaction authorization service may be implemented as a web service that provides a web service interface through which the target entity (e.g., an e-commerce web site application) may communicate with the transaction authorization service to initiate transactions.

As indicated at 544, the transaction authorization service confirms or authorizes the transaction with the source entity via a specified communications channel, for example at a phone number specified by the source entity during the registration process with the transaction authorization service. The phone number may, for example, be the number of a land-based phone, cell phone or other phone-capable device in the possession of the source entity. In one embodiment, the contact may include transmitting a text message requesting that the source entity authorize the initiated transaction. Note that other embodiments may initiate a cell or standard telephone call with either human or automated voice messages for the authorization request message. In one embodiment, the authorization request message may include a security phrase either entered by or provided to entity during registration to indicate that the message is from transaction authorization service.

In one embodiment, to authorize the transaction, the source entity may enter a PIN number or other identification code on a communications device (e.g., a land-based phone or cell phone) in response to the authorization request message received from the transaction authorization service over the specified communications channel. In one embodiment, the source entity may enter a different code or command to cancel or deny the transaction if desired. After receiving the response from the source entity including a PIN or other identifier, the transaction authorization service may verify that the PIN or other identifier provided by the source entity is valid. If the provided PIN or other identifier is not valid, then the transaction is not considered authorized by the transaction authorization service.

As indicated at 546, if the transaction is authorized by the source entity (and the authorization is determined to be valid), the transaction authorization service completes the transaction with the target entity. For example, the transaction authorization service may complete the transaction by electronically transferring funds from the source entity's account to an account specified by the target entity. Note that the target entity's account may be an account with the transaction authorization service or, alternatively, an account with a different entity, such as a bank. Alternative methods of completing the transaction with the target entity may be used, for example cutting a check to be sent to the target entity.

If the transaction was successfully completed by the transaction authorization service, the transaction authorization service may communicate with the target entity to indicate the successful completion of the transaction. In one embodiment, the communications from the transaction authorization service to the target entity may include other information relevant to the source entity and the transaction, such as a shipping address for the source entity. If the transaction was not authorized by the source entity or the authorization was determined to be invalid, the transaction authorization service may communicate with the target entity to indicate that the transaction was not completed, and may include in the communication information describing the reason.

FIG. 13 illustrates a method for authorization of transactions in which a target entity communicates with a transaction authorization service to initiate a transaction with a source entity, according to one embodiment. In this example, instead of the source entity communicating with the transaction authorization service or the target entity to initiate a transaction, the target entity communicates with the transaction authorization service to initiate a transaction with the source entity. This embodiment may be used, for example, to enable the target entity to request a payment from the source entity, while allowing the source entity to authorize the payment.

As indicated at 560, a target entity initiates a transaction with a source entity via a communications channel to a transaction authorization service. This communication may be via a voice message, a text message, an email, or via any other communications channel. The communication may include, but is not limited to, information identifying the source entity and an amount that the target entity is requesting to be transferred to the target entity by the source entity. The information identifying the source entity may also include information identifying a communications channel to be used to contact the source entity to authorize the transaction.

Once the transaction authorization service receives the communication from the target entity initiating a transaction, the transaction authorization service communicates with the source entity via a communications channel to authorize or deny the transaction, as indicated at 562. For example, the transaction authorization service may contact the source entity at a phone number or via another communications channel as specified by the source entity during a registration process with the transaction authorization service, or alternatively via a communications channel indicated in the communications received from the target entity. The phone number may, for example, be the number of a land-based phone, cell phone or other phone-capable device in the possession of the source entity. In one embodiment, the contact may include transmitting a text message requesting that the source entity authorize the initiated transaction. Note that other embodiments may initiate a cell or standard telephone call with either human or automated voice messages for the authorization request message. In one embodiment, the authorization request message may include a security phrase either entered by or provided to the source entity during registration to indicate that the message is from the transaction authorization service.

In one embodiment, to authorize the transaction, source entity may enter a PIN number or other identification code on a communications device (e.g., a land-based phone or cell phone) in response to the authorization request message received from the transaction authorization service via the communications channel. In one embodiment, the source entity may enter a different code or command to deny the transaction if desired. Note that, in one embodiment, the PIN number or other identifier may need to be entered to verify the cancellation or denial. The response of source entity 102 is then communicated to the transaction authorization service via the communications channel. After receiving the response from the source entity including a PIN or other identifier, the transaction authorization service may verify that the PIN or other identifier provided by the source entity is valid. If the provided PIN or other identifier is not valid, then the transaction is not considered authorized by the transaction authorization service.

In some embodiments, alternative methods of contacting the source entity to authorize a transaction may be used. For example, the transaction authorization service may contact the source entity via email, requesting authorization of the transaction. The source entity may then contact the transaction authorization service via a second, separate communications channel and communications device (e.g., a cell phone) to authorize (or deny) the transaction, in so doing providing the PIN number or other identification code via the communications device to authorize the transaction or deny the transaction.

If, at 564, the transaction is authorized (and the authorization is determined to be valid), the transaction authorization service completes the transaction with the target entity, as indicated at 566. If, at 564, the transaction is not authorized (or the authorization is determined to be invalid), the transaction authorization service notifies the target entity, as indicated at 568.

Exemplary User Interface

FIGS. 14 and 15 illustrate exemplary user interfaces as web pages for creating and managing accounts with a transaction authorization service according to one embodiment. Note that these user interfaces are exemplary and are not intended to be limiting. Also note that other user interfaces or web pages may be provided to users of the transaction authorization service (e.g., a home page that directs users to other pages, a page that allows registered users to log on to their accounts, help pages, tutorials, etc.)

FIG. 14 illustrates an exemplary registration page for a transaction authorization service according to one embodiment. Registration 300 page may include user interface elements for entering personal information, login information, and security information. In this example, personal information includes user interface elements to enter the name, email, address, city, state/territory, and ZIP code of the registrant (e.g., entity 102). Login information includes user interface elements to enter the mobile phone number and mobile carrier of the registrant. This phone number may represent the device the registrant intends to use for authorizing transactions. User interface elements are also provided for the registrant to create a password for the account. Security information includes a user interface element for the registrant to create a personal identifier code (e.g., a PIN number) that will be used in authorizing transactions. The PIN number may also be used for other identification purposes, for example to change the account password. Note again that FIG. 14 is exemplary; a registration page for a transaction authorization service may include additional user interface elements for entering other information and/or may not include some of the user interface elements shown here. In addition, other mechanisms or methods may be used to register and/or set up an account with a transaction authorization service in some embodiments.

FIG. 15 illustrates an exemplary personal account page for a transaction authorization service according to one embodiment. Personal page 302 may include user interface elements for initiating a transaction that allow the registered entity to enter information identifying a target entity, and an amount to be transferred from the registered entity's account to the target entity. In various embodiments, the information identifying the target entity may be one or more of a phone number, text message address, email address, alias (e.g. "Bob", or "Mom"), account number, and name. In one embodiment, the information identifying the target entity may be an identifier of a communications channel that is to be used to contact the target entity (e.g., a cell phone number or text message address). In one embodiment, the user interface may allow the registered entity to specify two or more destination entities. Personal page 302 may also include one or more user interface elements to view account information (e.g., account balance, previous transactions, transaction history, the status of current or outstanding transactions, etc.), user interface elements to change account information (e.g., to change phone numbers, addresses, security phrases, etc), and user interface elements to change the account password. Other user interface elements to perform other functions may be provided, such as a user interface element to cancel an outstanding transaction. Note that the user interface elements may be links that invoke other pages or views within the registered entity's account to perform the abovementioned functions or other functions. Note again that FIG. 15 is exemplary; a personal account page for a transaction authorization service may include additional user interface elements and/or may not include some of the user interface elements shown here.

Illustrative System

Figure 16:
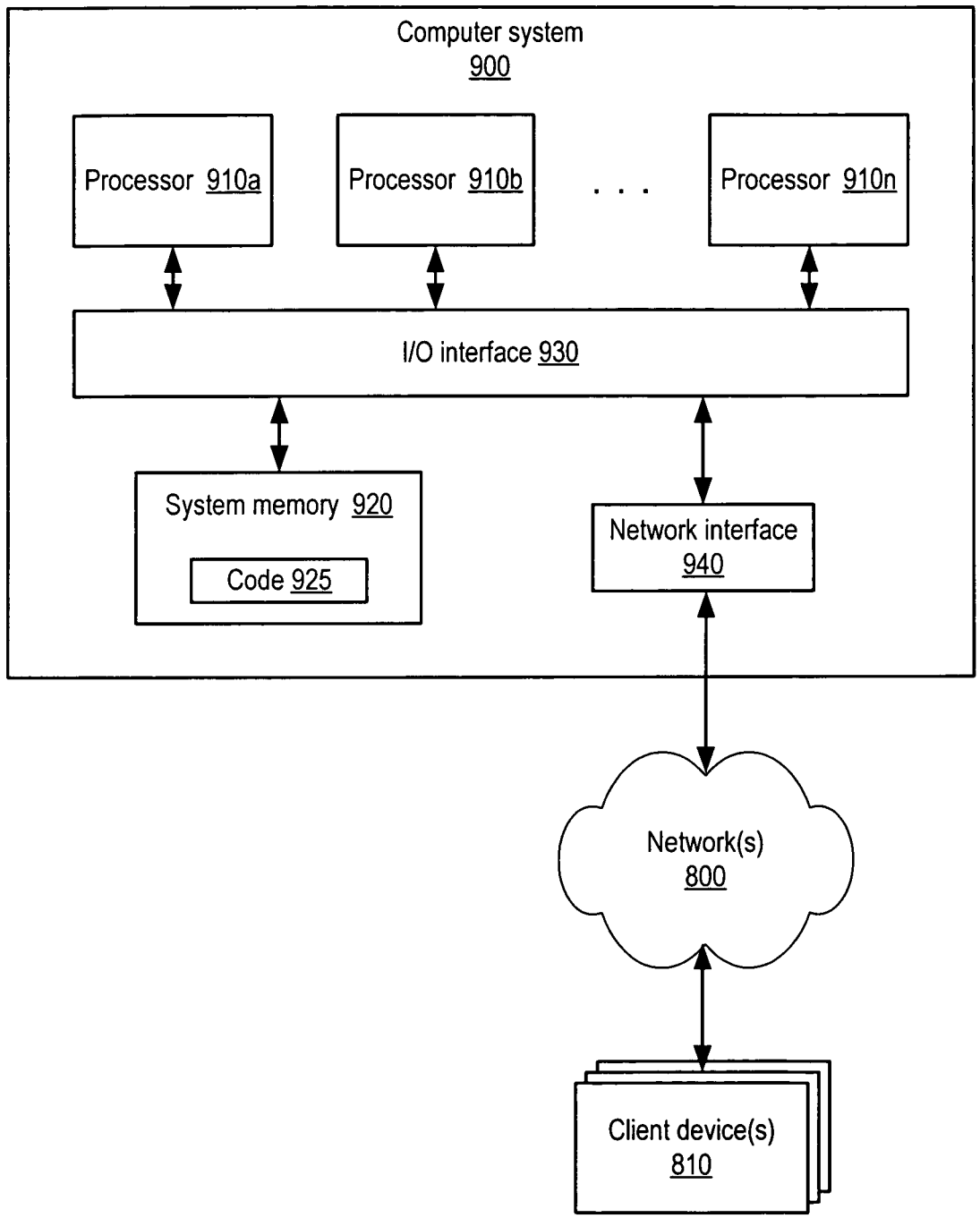
FIG. 16 is a block diagram illustrating an exemplary embodiment of a computer system.

In one embodiment, a Web server that implements one or more components of a transaction authorization mechanism as described herein may include a general-purpose computer system that includes or is configured to access one or more computer-accessible media, such as computer system 900 illustrated in FIG. 16. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a transaction authorization mechanism, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems or communications devices as illustrated in FIG. 3, for example. In particular, network interface 940 may be configured to allow communication between computer system 900 and client devices 810 through various communications channels via network(s) 800. These client devices 810 may include the various communications devices as illustrated in FIG. 3, and may include devices associated with source entities and devices associated with target entities. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 15 for implementing a transaction authorization service for authorizing transactions. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system for enabling payments by a user to a third party, comprising:

One or more processors; and memory having stored thereon program instructions that when executed by the one or more processors cause the one or more processors to implement:

registering users with a service center to establish at least two codes for each user, wherein registering users with the service center comprises, for a particular user:

assigning, to the particular user, one code for authenticating communications from the particular user to the service center; and for assigning, to the particular user, another code for authenticating communications from the service center to the particular user, wherein the code for authentication communications from the service center to the particular user is known only to the particular user and the service center;

establishing a payment account for the particular user;

receiving by the service center a message indicating initiation of a transaction between the particular user and a third party;

sending by the service center an authorization challenge to the particular user through a phone call requiring the particular user to enter the code for authenticating communications from the particular user to the service center, wherein the phone call includes the code for authenticating communications from the service center to the particular user to thus indicate to the particular user that the phone call is an authentic phone call from the service center;

for making payment to the third party from the payment account for the particular user once the transaction is authorized; and sending a confirmation message to means for sending a confirmation message to the particular user and to the third party that indicates that the payment has been made.

2. A method, comprising:

performing, by a transaction authorization service implemented on one or more computers:

registering a source entity with the transaction authorization service, wherein said registering the source entity comprises:

associating an identifier with the source entity, wherein the identifier identifies the source entity to the transaction authorization service; and assigning a security phrase to the source entity, wherein the security phrase is known only to the source entity and the transaction authorization service;

receiving a message from a target entity indicating initiation of a transaction between the source entity and the target entity;

sending, in response to the message from the target entity, an authorization request message indicating a request for authorization of the transaction from the transaction authorization service to a communications device of the source entity via a communications channel, wherein the authorization request message includes the security phrase assigned to the source entity, wherein the security phrase in the authorization request message indicates to the source entity that the authorization request message is an authentic message from the transaction authorization service; and receiving a response message indicating a response to the request for authorization from the source entity, wherein the response message includes information authorizing the transaction and the identifier associated with the source entity.

3. The method as recited in claim 2, further comprising sending an indication that the source entity has authorized the transaction from the transaction authorization service to the target entity.

4. The method as recited in claim 2, further comprising completing the transaction between the source entity and the target entity, wherein said completing the transaction between the source entity and the target entity comprises transferring funds from an account of the source entity to an account of the target entity.

5. The method as recited in claim 4, wherein the account of the source entity and the account of the target entity are with the transaction authorization service.

6. The method as recited in claim 4, wherein at least one of the account of the source entity and the account of the target entity is with a financial institution separate from the transaction authorization service.

7. The method as recited in claim 2, wherein the message from the target entity indicating the initiation of the transaction between the source entity and the target entity includes information identifying the source entity.

8. The method as recited in claim 2, wherein the message from the target entity indicating the initiation of the transaction between the source entity and the target entity includes information identifying the target entity and a monetary amount to be transferred from the source entity to the target entity.

9. The method as recited in claim 2, wherein the transaction is a transferal of funds from the source entity to the target entity.

10. The method as recited in claim 9, wherein the transferal of funds from the source entity to the target entity is for the purchase of goods or services from the target entity.

11. The method as recited in claim 2, wherein the information authorizing the transaction is the identifier associated with the source entity.

12. The method as recited in claim 11, wherein the identifier is a personal identification number (PIN).

13. The method as recited in claim 2, wherein said registering the source entity with the transaction authorization service creates an account for the source entity with the transaction authorization service.

14. The method as recited in claim 2, wherein said associating an identifier with the source entity comprises the source entity specifying the identifier.

15. The method as recited in claim 2, wherein said registering the source entity further comprises the source entity specifying a telephone number associated with the communications channel used in authorizing transactions.

16. The method as recited in claim 2, wherein said assigning a security phrase to the source entity comprises the source entity specifying the security phrase.

17. The method as recited in claim 2, wherein the communications device of the source entity is a cellular telephone.

18. The method as recited in claim 2, wherein the communications channel is a voice communications channel.

19. The method as recited in claim 2, wherein the communications channel is a cellular telephone communications channel.

20. The method as recited in claim 2, wherein the communications channel is a text messaging communications channel.

21. The method as recited in claim 2, wherein the transaction authorization service is implemented as a web service, and wherein the message from the target entity indicating the initiation of the transaction between the source entity and the target entity is received by the transaction authorization service in accordance with a web services interface.

22. The method as recited in claim 21, wherein the communications channel via which the transaction authorization service sends the authorization request message to the source entity is a voice communications channel.

23. The method as recited in claim 22, wherein the voice communications channel is a cellular telephone communications channel.

24. The method as recited in claim 22, wherein the transaction between the source entity and the target entity is initiated by the source entity, and wherein the source entity initiates the transaction with the target entity via a text messaging communications channel.

25. The method as recited in claim 21, wherein the source entity initiates the transaction with the target entity via a text messaging communications channel.

26. The method as recited in claim 2, wherein the target entity is an e-commerce enterprise, wherein the transaction between the source entity and the e-commerce enterprise is initiated by the source entity selecting the transaction authorization service as a payment method for the purchase of goods or services offered by the e-commerce enterprise.

27. The method as recited in claim 2, wherein the transaction between the source entity and the target entity is initiated by the source entity.

28. The method as recited in claim 27, wherein the source entity initiates the transaction via a different communications channel than the communications channel used in authorizing the transaction.

29. The method as recited in claim 2, wherein the transaction between the source entity and the target entity is initiated by the target entity.

30. The method as recited in claim 2, wherein said response message indicating the response to the request for authorization is received by the transaction authorization service on the same communications channel via which said authorization request message was sent.

31. A system, comprising:
a processor; and
a memory comprising program instructions, wherein the program instructions are executable by the processor to implement a transaction authorization service to:

register a source entity with the transaction authorization service, wherein, to register the source entity, the transaction authorization service is to:
associate an identifier with the source entity, wherein the identifier identifies the source entity to the transaction authorization service; and
assign a security phrase to the source entity, wherein the security phrase is known only to the source entity and the transaction authorization service;
receive a message from a target entity indicating initiation of a transaction between the source entity and the target entity;
in response to the message from the target entity, send an authorization request message indicating a request for authorization of the transaction to a communications device of the source entity via a communications channel, wherein the authorization request message includes the security phrase assigned to the source entity, wherein the security phrase in the authorization request message indicates to the source entity that the authorization request message is an authentic message from the transaction authorization service; and
receive a response message indicating a response to the request for authorization from the source entity, wherein the response message includes information authorizing the transaction and the identifier associated with the source entity.

32. The system as recited in claim 31, wherein the transaction authorization service further sends an indication that the source entity has authorized the transaction to the target entity.

33. The system as recited in claim 31, wherein the transaction authorization service further completes the transaction between the source entity and the target entity, wherein, to complete the transaction, the transaction authorization service further initiates the transfer of funds from an account of the source entity to an account of the target entity.

34. The system as recited in claim 33, wherein the account of the source entity and the account of the target entity are with the transaction authorization service.

35. The system as recited in claim 33, wherein at least one of the account of the source entity and the account of the target entity is with a financial institution separate from the transaction authorization service.

36. The system as recited in claim 31, wherein the message from the target entity indicating the initiation of the transaction between the source entity and the target entity includes information identifying the source entity, information identifying the target entity, and a monetary amount to be transferred from the source entity to the target entity.

37. The system as recited in claim 31, wherein the transaction is a transferal of funds from the source entity to the target entity.

38. The system as recited in claim 37, wherein the transferal of funds from the source entity to the target entity is for the purchase of goods or services from the target entity.

39. The system as recited in claim 31, wherein the information authorizing the transaction is the identifier associated with the source entity.

40. The system as recited in claim 31, wherein, to register the source entity, the transaction authorization service further creates an account for the source entity with the transaction authorization service.

41. The system as recited in claim 31, wherein, to register the source entity, the transaction authorization service further obtains a telephone number associated with the communications channel used in authorizing transactions.

42. The system as recited in claim 31, wherein, to assign a security phrase to the source entity, the transaction authorization service further obtains the security phrase from the source entity.

43. The system as recited in claim 31, wherein the communications channel is a voice communications channel.

44. The system as recited in claim 31, wherein the communications channel is a cellular telephone communications channel, and wherein the communications device of the source entity is a cellular telephone.

45. The system as recited in claim 31, wherein the communications channel is a text messaging communications channel.

46. The system as recited in claim 31, wherein the transaction authorization service is implemented as a web service, and wherein the message from the target entity indicating the initiation of the transaction between the source entity and the target entity is received by the transaction authorization service in accordance with a web services interface.

47. The system as recited in claim 46, wherein the communications channel via which the transaction authorization service sends the authorization request message to the source entity is a voice communications channel.

48. The system as recited in claim 47, wherein the transaction between the source entity and the target entity is initiated by the source entity, and wherein the source entity initiates the transaction with the target entity via a text messaging communications channel.

49. The system as recited in claim 31, wherein the target entity is an e-commerce enterprise, wherein the transaction between the source entity and the e-commerce enterprise is initiated by the source entity selecting the transaction authorization service as a payment method for the purchase of goods or services offered by the e-commerce enterprise.

50. The system as recited in claim 31, wherein the transaction between the source entity and the target entity is initiated by the source entity, wherein the source entity initiates the transaction via a different communications channel than the communications channel used in authorizing the transaction.

51. The system as recited in claim 31, wherein the transaction between the source entity and the target entity is initiated by the target entity.

52. A non-transitory computer-accessible storage medium comprising program instructions, wherein the program instructions are configured to implement a transaction authorization service configured to:
register a source entity with the transaction authorization service, wherein, to register the source entity, the transaction authorization service is configured to:
associate an identifier with the source entity, wherein the identifier identifies the source entity to the transaction authorization service; and
assign a security phrase to the source entity, wherein the security phrase is known only to the source entity and the transaction authorization service;
receive a message from a target entity indicating initiation of a transaction between the source entity and the target entity;
in response to the message from the target entity, send an authorization request message indicating a request for authorization of the transaction to a communications device of the source entity via a communications channel, wherein the authorization request message includes the security phrase assigned to the source entity, wherein the security phrase in the authorization request message indicates to the source entity that the authorization request message is an authentic message from the transaction authorization service; and receive a response message indicating a response to the request for authorization from the source entity, wherein the response message includes information authorizing the transaction and the identifier associated with the source entity.

53. The non-transitory computer-accessible storage medium as recited in claim 52, wherein the transaction authorization service is further configured to send an indication that the source entity has authorized the transaction to the target entity.

54. The non-transitory computer-accessible storage medium as recited in claim 52, wherein the transaction authorization service is further configured to complete the transaction between the source entity and the target entity, wherein, to complete the transaction, the transaction authorization service is further configured to initiate the transfer of funds from an account of the source entity to an account of the target entity.

55. The non-transitory computer-accessible storage medium as recited in claim 54, wherein the account of the source entity and the account of the target entity are with the transaction authorization service.

56. The non-transitory computer-accessible storage medium as recited in claim 54, wherein at least one of the account of the source entity and the account of the target entity is with a financial institution separate from the transaction authorization service.

57. The non-transitory computer-accessible storage medium as recited in claim 52, wherein the message from the target entity indicating the initiation of the transaction between the source entity and the target entity includes information identifying the source entity.

58. The non-transitory computer-accessible storage medium as recited in claim 52, wherein the message from the target entity indicating the initiation of the transaction between the source entity and the target entity includes information identifying the source entity, information identifying the target entity, and a monetary amount to be transferred from the source entity to the target entity.

59. The non-transitory computer-accessible storage medium as recited in claim 52, wherein the transaction is a transferal of funds from the source entity to the target entity.

60. The non-transitory computer-accessible storage medium as recited in claim 59, wherein the transferal of funds from the source entity to the target entity is for the purchase of goods or services from the target entity.

61. The non-transitory computer-accessible storage medium as recited in claim 52, wherein the information authorizing the transaction is the identifier associated with the source entity.

62. The non-transitory computer-accessible storage medium as recited in claim 52, wherein, to register the source entity, the transaction authorization service is configured to:

create an account for the source entity with the transaction authorization service; and obtain, from the source entity, a telephone number associated with the communications channel used in authorizing transactions.

63. The non-transitory computer-accessible storage medium as recited in claim 52, wherein the security phrase is known only to the transaction authorization service and the source entity.

64. The non-transitory computer-accessible storage medium as recited in claim 52, wherein the communications channel is a voice communications channel.

65. The non-transitory computer-accessible storage medium as recited in claim 52, wherein the communications channel is a cellular telephone communications channel, and wherein the communications device of the source entity is a cellular telephone.

66. The non-transitory computer-accessible storage medium as recited in claim 52, wherein the communications channel is a text messaging communications channel.

67. The non-transitory computer-accessible storage medium as recited in claim 52, wherein the transaction authorization service is implemented as a web service, and wherein the message from the target entity indicating the initiation of the transaction between the source entity and the target entity is received by the transaction authorization service in accordance with the web services interface.

68. The non-transitory computer-accessible storage medium as recited in claim 67, wherein the communications channel via which the transaction authorization service sends the authorization request message to the source entity is a voice communications channel.

69. The non-transitory computer-accessible storage medium as recited in claim 68, wherein the transaction between the source entity and the target entity is initiated by the source entity, and wherein the source entity initiates the transaction with the target entity via a text messaging communications channel.

70. The non-transitory computer-accessible storage medium as recited in claim 52, wherein the target entity is an e-commerce enterprise, wherein the transaction between the source entity and the e-commerce enterprise is initiated by the source entity selecting the transaction authorization service as a payment method for the purchase of goods or services offered by the e-commerce enterprise.

71. The non-transitory computer-accessible storage medium as recited in claim 52, wherein the transaction between the source entity and the target entity is initiated by the source entity, wherein the source entity initiates the transaction via a different communications channel than the communications channel used in authorizing the transaction.

72. The non-transitory computer-accessible storage medium as recited in claim 52, wherein the transaction between the source entity and the target entity is initiated by the target entity.

* * * * *